(12) United States Patent
Manabe et al.

(10) Patent No.: US 9,657,231 B2
(45) Date of Patent: May 23, 2017

(54) LIQUID CRYSTAL MEDIUM AND HIGH-FREQUENCY COMPONENTS CONTAINING THE SAME

(75) Inventors: Atsutaka Manabe, Bensheim (DE); Mark Goebel, Darmstadt (DE); Elvira Montenegro, Weinheim (DE)

(73) Assignee: Merck Patent GMBH, Darmstadt (DE)

( * ) Notice: Subject to any disclaimer, the term of this patent is extended or adjusted under 35 U.S.C. 154(b) by 295 days.

(21) Appl. No.: 13/386,087

(22) PCT Filed: Jun. 29, 2010

(86) PCT No.: PCT/EP2010/003933
§ 371 (c)(1),
(2), (4) Date: Jan. 20, 2012

(87) PCT Pub. No.: WO2011/009524
PCT Pub. Date: Jan. 27, 2011

(65) Prior Publication Data
US 2012/0119141 A1    May 17, 2012

(30) Foreign Application Priority Data
Jul. 21, 2009 (DE) .................. 10 2009 034 301

(51) Int. Cl.
G02F 1/1333 (2006.01)
C09K 19/44 (2006.01)
C09K 19/12 (2006.01)
C09K 19/16 (2006.01)
C09K 19/18 (2006.01)
C09K 19/04 (2006.01)

(52) U.S. Cl.
CPC .............. *C09K 19/44* (2013.01); *C09K 19/12* (2013.01); *C09K 19/16* (2013.01); *C09K 19/18* (2013.01); *C09K 2019/0407* (2013.01); *C09K 2019/123* (2013.01); *C09K 2019/124* (2013.01); *C09K 2019/183* (2013.01); *C09K 2219/11* (2013.01)

(58) Field of Classification Search
CPC ........ C09K 19/44; C09K 19/12; C09K 19/16; C09K 19/18; C09K 2019/0407; C09K 2019/123; C09K 2019/124; C09K 2019/183; C09K 2219/11; G02F 1/1333
See application file for complete search history.

(56) References Cited
U.S. PATENT DOCUMENTS

| 6,613,401 | B2 | 9/2003 | Hirschmann et al. |
| 6,790,488 | B1 | 9/2004 | Nakajima et al. |
| 7,183,447 | B2 | 2/2007 | Pauluth et al. |
| 7,211,302 | B2 | 5/2007 | Manabe et al. |
| 7,361,288 | B2 | 4/2008 | Lussen et al. |
| 7,635,505 | B2 | 12/2009 | Manabe et al. |
| 8,124,817 | B2 | 2/2012 | Pauluth et al. |
| 2004/0006235 | A1 | 1/2004 | Pauluth et al. |
| 2005/0067605 | A1 | 3/2005 | Lussem et al. |
| 2008/0128653 | A1 | 6/2008 | Manabe et al. |
| 2010/0271576 | A1 | 10/2010 | Pauluth et al. |
| 2010/0320420 | A1 | 12/2010 | Hirschmann et al. |

FOREIGN PATENT DOCUMENTS

| DE | 10 2004 29 429 | 2/2005 |
| DE | 10 2008 024 866 | 6/2009 |
| EP | 1 002 848 | 5/2000 |
| EP | 1 126 006 | 8/2001 |
| EP | 1 213 339 | 6/2002 |

(Continued)

OTHER PUBLICATIONS

Machine translation of Kotani et al. (Japanese Patent No. JP-2005-213423).*

(Continued)

*Primary Examiner* — Geraldina Visconti
(74) *Attorney, Agent, or Firm* — Millen White Zelano and Branigan, PC; John Sopp; Anthony Zelano

(57) ABSTRACT

The present invention relates to liquid-crystalline media comprising
  at least one compound of the formula I and
  at least one compound of the formula II
or
  at least one compound of the formula I and
  at least one compound of the formula III
or
  at least one compound of the formula II and
  at least one compound of the formula III
or
  at least one compound of the formula I and
  at least one compound of the formula II and
  at least one compound of the formula III:

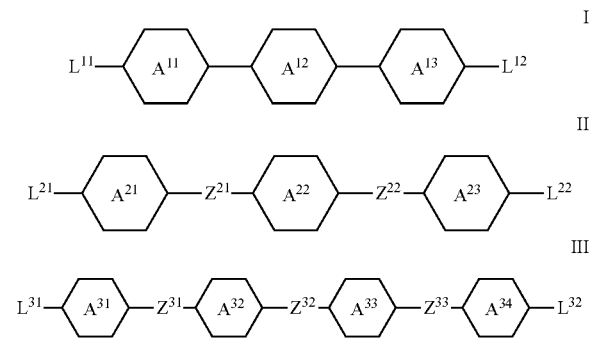

in which the parameters have the meaning indicated in Claim 1, and to components comprising these media for high-frequency technology, in particular phase shifters and microwave array antennas.

50 Claims, No Drawings

(56) References Cited

FOREIGN PATENT DOCUMENTS

| | | |
|---|---|---|
| EP | 1 346 995 | 9/2003 |
| EP | 2 075 601 | 7/2009 |
| JP | 2003507526 | 2/2003 |
| JP | 2004285085 A | 10/2004 |
| JP | 2005 120208 | 5/2005 |
| JP | 2005213226 A | 8/2005 |
| JP | 2005213423 A | 8/2005 |
| JP | 2005232455 | 9/2005 |
| JP | 2006017847 A | 1/2006 |
| JP | 2007051275 | 3/2007 |
| JP | 2008502754 A | 1/2008 |
| WO | WO-2005 123879 | 12/2005 |
| WO | WO-2009 115226 | 9/2009 |

OTHER PUBLICATIONS

"Mikrowellentechnik, Microwave Engineering" R. Jakoby, Präsentation TU Darmstadt, Jun. 16, 2008.

Dainippon Ink & Chem Inc., "Variable function device," Patent Abstracts of Japan, Publication Date: May 12, 2005; English Abstract of JP-2005 120208.

Gaebler, A. et al., "Direct simulation of material permittivities by using an eigen-susceptibility formulation of the vector variational approach," International Instrumentation and Measurement Technology, Conference, May 5-7, 2009, pp. 463-467.

International Search Report for PCT/EP2010/003933 dated Oct. 12, 2010.

Liao, Y. et al., "High birefringence isothiocyanato Bistolane liquid crystals for display application," IDMC, 2005, pp. 589-592.

Penirschke, A. et al., "Cavity perturbation method for characterization of Liquid Crystals up to 35 GHz," 34$^{th}$ European Microwave Conference—Amsterdam, 2004, pp. 545-548.

Official Action related to corresponding Japanese Patent Application No. 2012-520920 dated Sep. 16, 2014.

Second Office Action corresponding to Appln. No. 2015-157081—Drafting Date: Dec. 27, 2016—Dispatching Date: Jan. 4, 2017.

Bibliographic data: English Abstract of—JP2005232455 (A)—Sep. 2, 2005.

Bibliographic data: English Abstract of—JP 2007051275 (A)—Mar. 1, 2007.

\* cited by examiner

LIQUID CRYSTAL MEDIUM AND HIGH-FREQUENCY COMPONENTS CONTAINING THE SAME

FIELD OF THE INVENTION

The present invention relates to liquid-crystalline media and to high-frequency components comprising same, especially microwave components for high-frequency devices, such as devices for shifting the phase of microwaves, in particular for microwave phased-array antennas.

Prior Art and Problem to be Solved

Liquid-crystalline media have a been used for some time in electro-optical displays (liquid crystal displays—LCDs) in order to display information.

U.S. Pat. No. 7,183,447 discloses various laterally fluorinated, mesogenic quaterphenyl compounds.

U.S. Pat. No. 7,211,302 discloses, inter alia, liquid-crystalline media which, besides polar terphenyl compounds of the formulae

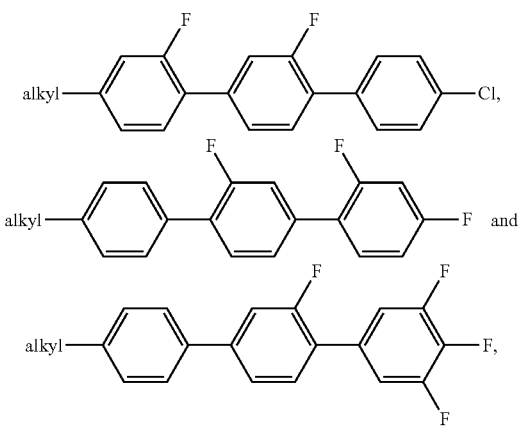

also comprise small amounts of quaterphenyl compounds of the formula

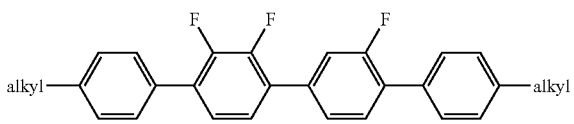

in order to improve the stability of the media, in particular to UV irradiation.

Recently, however, liquid-crystalline media have also been proposed for use in components for microwave technology, such as, for example, in DE 10 2004 029 429 A and in JP 2005-120208 (A).

As a typical microwave application, the concept of the inverted microstrip line as described by K. C. Gupta, R. Garg, I. Bahl and P. Bhartia: Microstrip Lines and Slotlines, $2^{nd}$ ed., Artech House, Boston, 1996, is employed, for example, in D. Dolfi, M. Labeyrie, P. Joffre and J. P. Huignard: Liquid Crystal Microwave Phase Shifter. *Electronics Letters*, Vol. 29, No. 10, pp. 926-928, May 1993, N. Martin, N. Tentillier, P. Laurent, B. Splingart, F. Huert, P H. Gelin, C. Legrand: Electrically Microwave Tunable Components Using Liquid Crystals. $32^{nd}$ European Microwave Conference, pp. 393-396, Milan 2002, or in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002, C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, together with the commercial liquid crystal K15 from Merck KGaA. C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, achieve phase shifter qualities of 12°/dB at 10 GHz with a control voltage of about 40 V therewith. The insertion losses of the LC, i.e. the losses caused only by the polarisation losses in the liquid crystal, are given as approximately 1 to 2 dB at 10 GHz in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002. In addition, it has been determined that the phase shifter losses are determined primarily by the dielectric LC losses and the losses at the waveguide junctions. T. Kuki, H. Fujikake, H. Kamoda and T. Nomoto: Microwave Variable Delay Line Using a Membrane Impregnated with Liquid Crystal. *IEEE MTT-S Int. Microwave Symp. Dig.* 2002, pp. 363-366, June 2002, and T. Kuki, H. Fujikake, T. Nomoto: Microwave Variable Delay Line Using Dual-Frequency Switching-Mode Liquid Crystal. *IEEE Trans. Microwave Theory Tech.*, Vol. 50, No. 11, pp. 2604-2609, November 2002, also address the use of polymerised LC films and dual-frequency switching-mode liquid crystals in combination with planar phase shifter arrangements.

A. Penirschke, S. Müller, P. Scheele, C. Weil, M. Wittek, C. Hock and R. Jakoby: "Cavity Perturbation Method for Characterization of Liquid Crystals up to 35 GHz", $34^{th}$ European Microwave Conference—Amsterdam, pp. 545-548 describe, inter alia, the properties of the known single liquid-crystalline substance K15 (Merck KGaA, Germany) at a frequency of 9 GHz.

A. Gaebler, F. Goelden, S. Müller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid-crystal mixture E7 (likewise Merck KGaA, Germany).

DE 10 2004 029 429 A describes the use of liquid-crystal media in microwave technology, inter alia in phase shifters. DE 10 2004 029 429 A has already investigated liquid-crystalline media with respect to their properties in the corresponding frequency range. In addition, it describes liquid-crystalline media which comprise compounds of the formulae

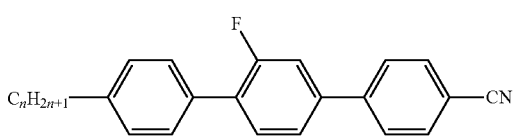

besides compounds of the formulae

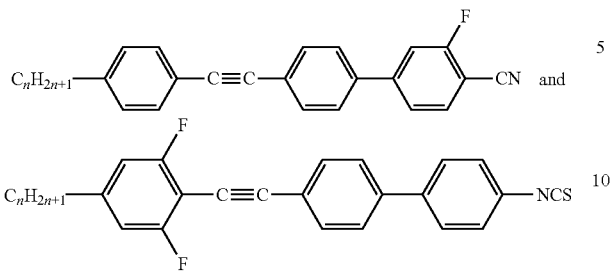

or besides compounds of the formulae

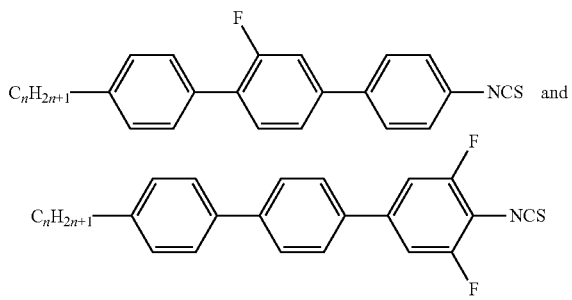

However, these compositions are afflicted with serious disadvantages. Most of them result, besides other deficiencies, in disadvantageously high losses and/or inadequate phase shifts or inadequate material quality.

For these applications, liquid-crystalline media having particular, hitherto rather unusual, uncommon properties, or combinations of properties, are required.

Novel liquid-crystalline media having improved properties are thus necessary. In particular, the loss in the microwave region must be reduced and the material quality ($\eta$) must be improved.

In addition, there is a demand for an improvement in the low-temperature behaviour of the components. Both an improvement in the operating properties and also in the shelf life are necessary here.

There is therefore a considerable demand for liquid-crystalline media having suitable properties for corresponding practical applications.

PRESENT INVENTION

Surprisingly, it has now been found that it is possible to achieve liquid-crystalline media having a suitably high $\Delta\epsilon$, a suitable, nematic phase range and $\Delta n$ which do not have the disadvantages of the prior-art materials, or at least only do so to a considerably reduced extent.

These improved liquid-crystalline media in accordance with the present invention comprise
    at least one compound of the formula I and
    at least one compound of the formula II
or
    at least one compound of the formula I and
    at least one compound of the formula III
or
    at least one compound of the formula II and
    at least one compound of the formula III
or
    at least one compound of the formula I and
    at least one compound of the formula II and
    at least one compound of the formula III

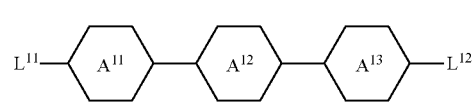

in which
$L^{11}$ denotes $R^{11}$ or $X^{11}$,
$L^{12}$ denotes $R^{12}$ or $X^{12}$,
$R^{11}$ and $R^{12}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
$X^{11}$ and $X^{12}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and

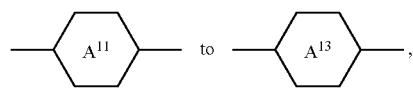

independently of one another, denote

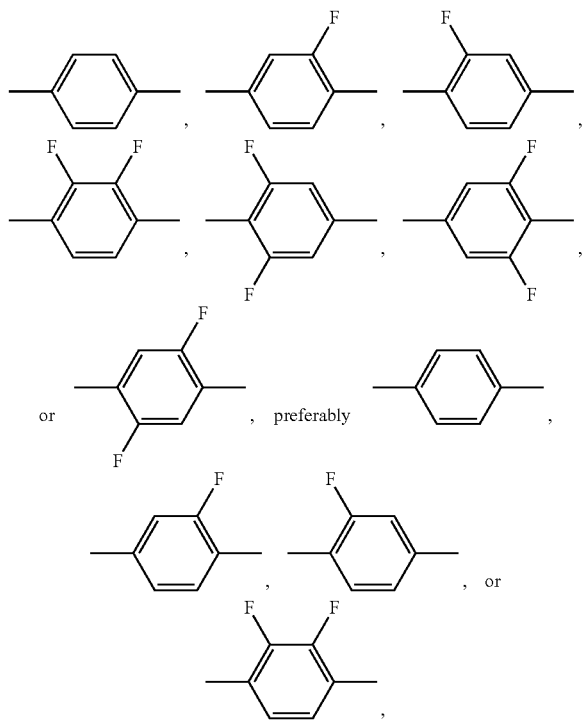

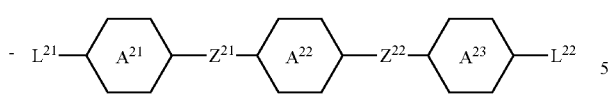   II in which $L^{21}$ denotes $R^{21}$ and, in the case where $Z^{21}$ and/or $Z^{22}$ denote trans-CH=CH— or trans-CF=CF—, alternatively denotes $X^{21}$, $L^{22}$ denotes $R^{22}$ and, in the case where $Z^{21}$ and/or $Z^{22}$ denote trans-CH=CH— or trans-CF=CF—, alternatively denotes $X^{22}$, $R^{21}$ and $R^{22}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{21}$ and $X^{22}$, independently of one another, denote F or Cl, —CN, —NCS, —SF$_5$, fluorinated alkyl or alkoxy having 1 to 7 C atoms or fluorinated alkenyl, alkenyloxy or alkoxyalkyl having 2 to 7 C atoms, or —NCS, preferably —NCS, one of $Z^{21}$ and $Z^{22}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

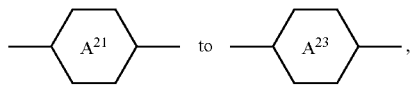

independently of one another, denote

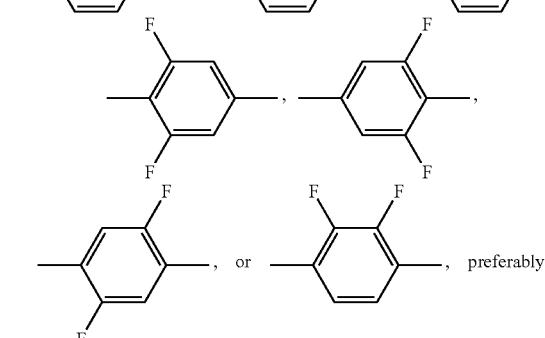

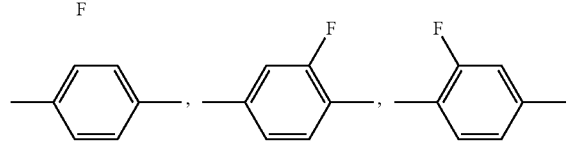

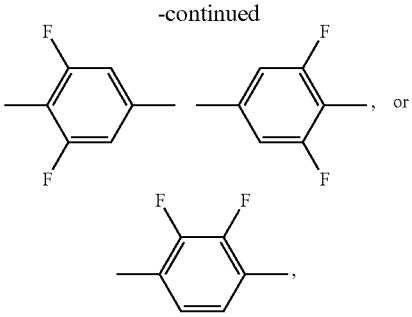, or

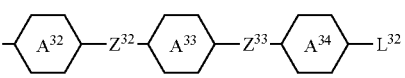   III in which $L^{31}$ denotes $R^{31}$ or $X^{31}$, $L^{32}$ denotes $R^{32}$ or $X^{32}$, $R^{31}$ and $R^{32}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{31}$ and $X^{32}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and $Z^{31}$ to $Z^{33}$, independently of one another, denote trans-CH=CH—, trans-CF=CF—, —C≡C— or a single bond, preferably one or more of them denotes a single bond, particularly preferably all denote a single bond, and

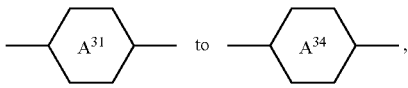

independently of one another, denote

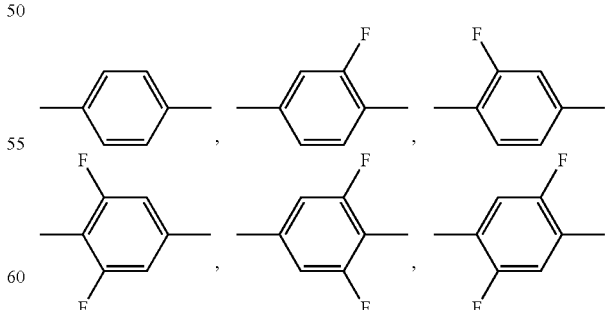

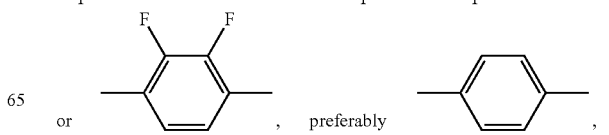

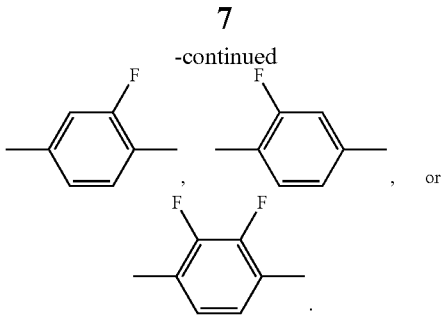

In a preferred embodiment of the present invention, the liquid-crystalline media comprise one or more compounds of the formula I and one or more compounds of the formula III.

In a further preferred embodiment of the present invention, the liquid-crystalline media comprise one or more compounds of the formula I and one or more compounds of the formula II.

The liquid-crystalline media in accordance with the present invention likewise preferably comprise one or more compounds of the formula II and one or more compounds of the formula III.

Particular preference is given in accordance with the present invention to liquid-crystalline media which comprise one or more compounds of the formula I, one or more compounds of the formula II and one or more compounds of the formula III.

The liquid-crystalline media in accordance with the present application preferably comprise in total 15 to 90%, preferably 20 to 85% and particularly preferably 25 to 80%, of compounds of the formula I. The liquid-crystalline media in accordance with the present application preferably comprise in total 1 to 70%, preferably 2 to 65% and particularly preferably 3 to 60%, of compounds of the formula II.

The liquid-crystalline media in accordance with the present application preferably comprise in total 0 to 60%, preferably 5 to 55% and particularly preferably 10 to 50%, of compounds of the formula III.

In a preferred embodiment of the present invention, in which the liquid-crystalline media comprise in each case one or more compounds of the formulae I, II and III, the concentration of the compounds of the formula I is preferably 45 to 75%, preferably 50 to 70% and particularly preferably 55 to 65%, the concentration of the compounds of the formula II is preferably 1 to 20%, preferably 2 to 15% and particularly preferably 3 to 10%, and the concentration of the compounds of the formula III is preferably 1 to 30%, preferably 5 to 25% and particularly preferably 5 to 20%.

In a further preferred embodiment of the present invention, in which the liquid-crystalline media comprise in each case one or more compounds of the formulae I, II and III, the concentration of the compounds of the formula I is preferably 15 to 40%, preferably 20 to 35% and particularly preferably 25 to 30%, the concentration of the compounds of the formula II is preferably 10 to 35%, preferably 15 to 30% and particularly preferably 20 to 25%, and the concentration of the compounds of the formula III is preferably 25 to 50%, preferably 30 to 45% and particularly preferably 35 to 40%.

In a preferred embodiment of the present invention, in which the liquid-crystalline media comprise in each case one or more compounds of the formulae I and II, but at most 5% and preferably no compounds of the formula III, the concentration of the compounds of the formula I is preferably 10 to 50%, preferably 20 to 40% and particularly preferably 25 to 35%, the concentration of the compounds of the formula II is preferably 40 to 70%, preferably 50 to 65% and particularly preferably 55 to 60%, and the concentration of the compounds of the formula III is preferably 1 to 4%, preferably 1 to 3% and particularly preferably 0%.

The liquid-crystalline media in accordance with the present application particularly preferably comprise in total 50 to 80%, preferably 55 to 75% and particularly preferably 57 to 70%, of compounds of the formula I-1 and/or in total 5 to 70%, preferably 6 to 50% and particularly preferably 8 to 20% of compounds selected from the group of the compounds of the formulae I-2 and I-3.

The liquid-crystalline media in accordance with the present application likewise preferably comprise in total 5 to 60%, preferably 10 to 50% and particularly preferably 7 to 20% of compounds of the formula II.

In the case of the use of a single homologous compound, these limits correspond to the concentration of this homologue, which is preferably 2 to 20%, particularly preferably 1 to 15%. In the case of the use of two or more homologues, the concentration of the individual homologues is likewise preferably in each case 1 to 15%.

The compounds of the formulae I to III in each case include dielectrically positive compounds having a dielectric anisotropy of greater than 3, dielectrically neutral compounds having a dielectric anisotropy of less than 3 and greater than −1.5 and dielectrically negative compounds having a dielectric anisotropy of −1.5 or less.

In a preferred embodiment of the present invention, the liquid-crystal medium comprises one or more compounds of the formula I, preferably selected from the group of the compounds of the formulae I-1 to I-3, preferably of the formulae I-1 and/or I-2 and/or I-3, preferably of the formulae I-1 and I-2, more preferably these compounds of the formula I predominantly consist, even more preferably essentially consist and very particularly preferably completely consist thereof:

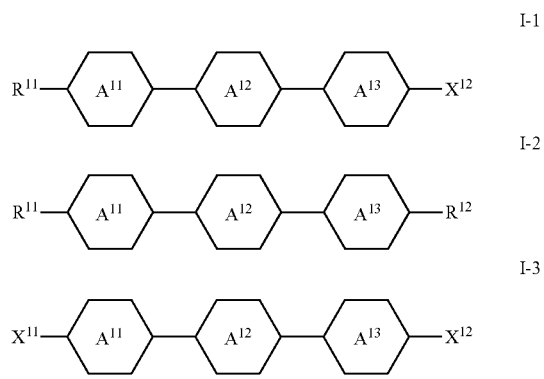

in which the parameters have the respective meanings indicated above for formula I and preferably $R^{11}$ denotes unfluorinated alkyl having 1 to 7 C atoms or unfluorinated alkenyl having 2 to 7 C atoms, $R^{12}$ denotes unfluorinated alkyl having 1 to 7 C atoms or unfluorinated alkenyl having 2 to 7 C atoms or unfluorinated alkoxy having 1 to 7 C atoms, $X^{11}$ and $X^{12}$, independently of one another, denote F, Cl, —OCF$_3$, —CF$_3$, —CN, —NCS or —SF$_5$, preferably F, Cl, —OCF$_3$ or —CN.

The compounds of the formula I-1 are preferably selected from the group of the compounds of the formulae I-1a to I-1d, more preferably these compounds of the formula I-1 predominantly consist, even more preferably essentially consist and very particularly preferably completely consist thereof:

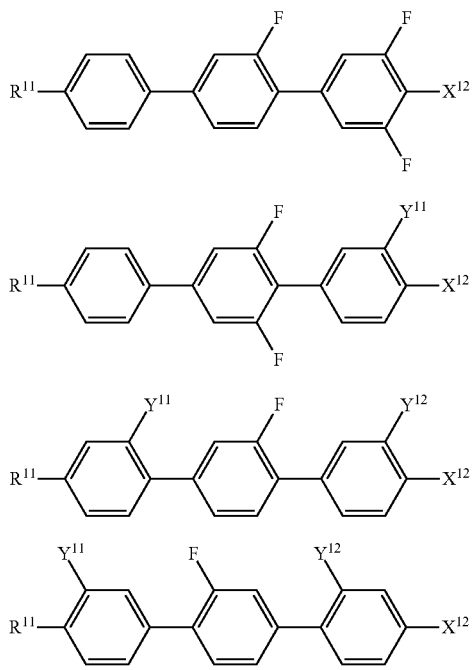

in which the parameters have the respective meanings indicated above for formula I-1 and in which
$Y^{11}$ and $Y^{12}$ each, independently of one another, denote H or F, and preferably
$R^{11}$ denotes alkyl or alkenyl, and
$X^{11}$ denotes F, Cl or —OCF$_3$.

The compounds of the formula I-2 are preferably selected from the group of the compounds of the formulae I-2a to I-2e and/or from the group of the compounds of the formulae I-2f and I-2g, more preferably these compounds of the formula I-2 predominantly consist, even more preferably essentially consist and very particularly preferably completely consist thereof:

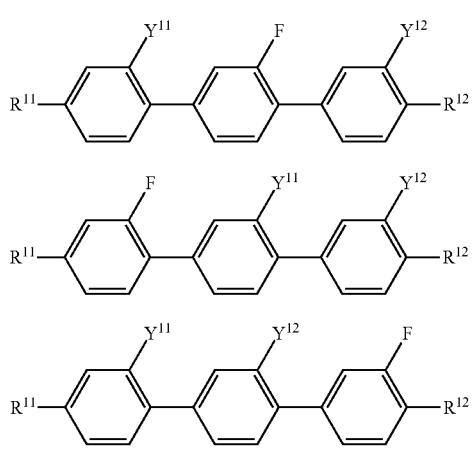

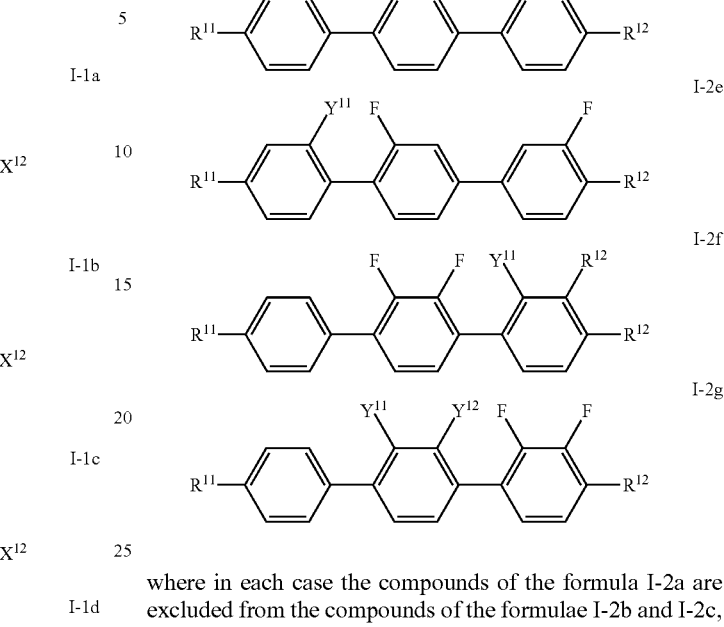

where in each case the compounds of the formula I-2a are excluded from the compounds of the formulae I-2b and I-2c, the compounds of the formula I-2b are excluded from the compounds of the formulae I-2c and the compounds of the formula I-2g are excluded from the compounds of the formulae I-2f, and
in which the parameters have the respective meanings indicated above for formula I-1 and in which
$Y^{11}$ and $Y^{12}$ each, independently of one another, denote H or F, and preferably
$R^{11}$ denotes alkyl or alkenyl,
$X^{11}$ denotes F, Cl or —OCF$_3$, and preferably one of $Y^{11}$ and $Y^{12}$ denotes H and the other denotes H or F, preferably likewise denotes H.

The compounds of the formula I-3 are preferably compounds of the formula I-3a:

I-3a

[structure: X$^{11}$—phenyl—phenyl(F)—phenyl—X$^{12}$]

in which the parameters have the respective meanings indicated above for formula I-1 and in which preferably
$X^{11}$ denotes F, Cl, preferably F,
$X^{12}$ denotes F, Cl or —OCF$_3$, preferably —OCF$_3$.

In an even more preferred embodiment of the present invention, the compounds of the formula I are selected from the group of the compounds I-1a to I-1d, preferably selected from the group of the compounds I-1c and I-1d, more preferably the compounds of the formula I predominantly consist, even more preferably essentially consist and very particularly preferably completely consist thereof:

The compounds of the formula I-1a are preferably selected from the group of the compounds I-1a-1 and I-1a-2, more preferably these compounds of the formula I-1a predominantly consist, even more preferably essentially consist and very particularly preferably completely consist thereof:

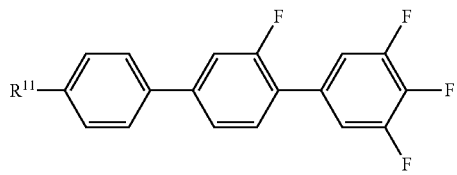

I-1a-1

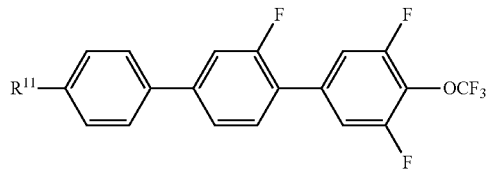

I-1a-2 in which
R$^{11}$ has the meaning indicated above and preferably denotes
C$_n$H$_{2n+1}$, in which
n denotes an integer in the range from 0 to 7, preferably in the range from 1 to 5 and particularly preferably 3 or 7.

The compounds of the formula I-1b are preferably compounds of the formula I-1b-1:

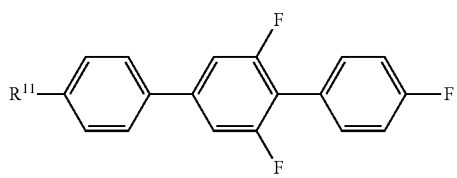

I-1b-1 in which
R$^{11}$ has the meaning indicated above and preferably denotes
C$_n$H$_{2n+1}$, in which
n denotes an integer in the range from 0 to 15, preferably in the range from 1 to 7 and particularly preferably 1 to 5.

The compounds of the formula I-1c are preferably selected from the group of the compounds of the formulae I-1c-1 and I-1c-4, preferably selected from the group of the compounds of the formulae I-1c-1 and I-1c-2, more preferably these compounds of the formula I-1c predominantly consist, even more preferably essentially consist and very particularly preferably completely consist thereof:

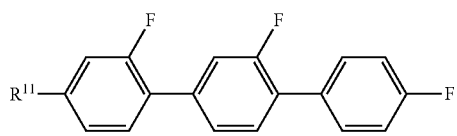

I-1c-1

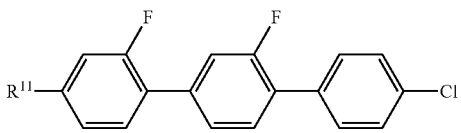

I-1c-2

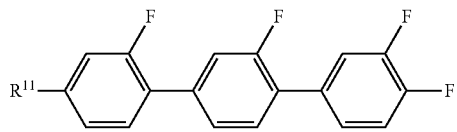

I-1c-3

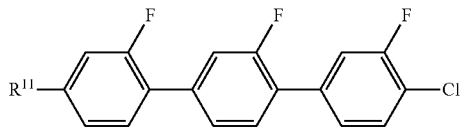

I-1c-4 in which
R$^{11}$ has the meaning indicated above and preferably denotes
C$_n$H$_{2n+1}$, in which
n denotes an integer in the range from 0 to 15, preferably in the range from 1 to 7 and particularly preferably 1 to 5.

The compounds of the formula I-1d are preferably selected from the group of the compounds of the formulae I-1d-1 and I-1d-2, preferably the compound of the formula I-1d-2, more preferably these compounds of the formula I-1d predominantly consist, even more preferably essentially consist and very particularly preferably completely consist thereof:

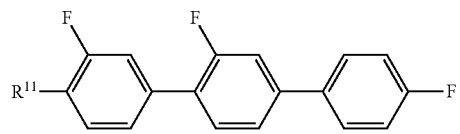

I-1d-1

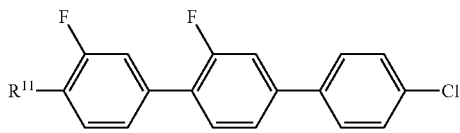

I-1d-2 in which
R$^{11}$ has the meaning indicated above and preferably denotes
C$_n$H$_{2n+1}$, in which
n denotes an integer in the range from 0 to 15, preferably in the range from 1 to 7 and particularly preferably 1 to 5.

The compounds of the formula I-2a are preferably selected from the group of the compounds of the formulae I-2a-1 and I-2a-2, preferably the compounds of the formula I-1a-1, more preferably these compounds of the formula I-2a predominantly consist, even more preferably essentially consist and very particularly preferably completely consist thereof:

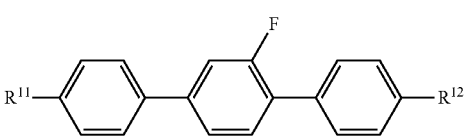

I-2a-1

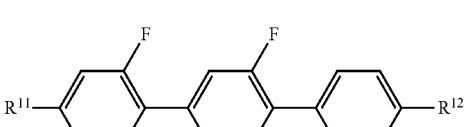

I-2a-2 in which
R$^{11}$ has the meaning indicated above and preferably denotes
C$_n$H$_{2n+1}$ or CH$_2$=CH—(CH$_2$)$_Z$, and
R$^{12}$ has the meaning indicated above and preferably denotes
C$_m$H$_{2m+1}$ or O—C$_m$H$_{2m+1}$ or (CH$_2$)$_Z$—CH=CH$_2$,
and in which n and m, independently of one another, denote an integer in the range from 0 to 15, preferably in the range from 1 to 7 and particularly preferably 1 to 5, and z denotes 0, 1, 2, 3 or 4, preferably 0 or 2.

Preferred combinations of ($R^{11}$ and $R^{12}$), in particular in formula I-2a-1, are ($C_nH_{2n+1}$ and $C_mH_{2m+1}$), ($C_nH_{2n+1}$ and O—$C_mH_{2m+1}$), ($CH_2$=CH—$(CH_2)_Z$ and $C_mH_{2m+1}$), ($CH_2$=CH—$(CH_2)_Z$ and O—$C_mH_{2m+1}$) and ($C_nH_{2n+1}$ and $(CH_2)_Z$—CH=$CH_2$).

Preferred compounds of the formula I-2b are the compounds of the formula I-2b-1:

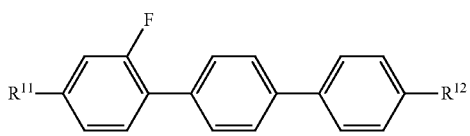

I-2b-1 in which $R^{11}$ has the meaning indicated above and preferably denotes $C_nH_{2n+1}$ or $CH_2$=CH—$(CH_2)_Z$, and $R^{12}$ has the meaning indicated above and preferably denotes $C_mH_{2m+1}$ or O—$C_mH_{2m+1}$ or $(CH_2)_Z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula I-2c are the compounds of the formula I-2c-1:

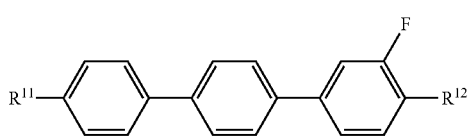

I-2c-1 in which $R^{11}$ has the meaning indicated above and preferably denotes $C_nH_{2n+1}$ or $CH_2$=CH—$(CH_2)_Z$, and $R^{12}$ has the meaning indicated above and preferably denotes $C_mH_{2m+1}$ or O—$C_mH_{2m+1}$ or $(CH_2)_Z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula I-2d are the compounds of the formula I-2d-1:

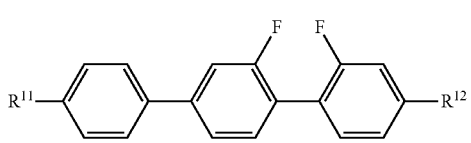

I-2d-1 in which $R^{11}$ has the meaning indicated above and preferably denotes $C_nH_{2n+1}$ or $CH_2$=CH—$(CH_2)_Z$, and $R^{12}$ has the meaning indicated above and preferably denotes $C_mH_{2m+1}$ or O—$C_mH_{2m+1}$ or $(CH_2)_Z$—CH=$CH_2$, and in which n and m, independently of one another, denote an integer in the range from 0 to 15, preferably in the range from 1 to 7 and particularly preferably 1 to 5, and z 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula I-2e are the compounds of the formula I-2e-1:

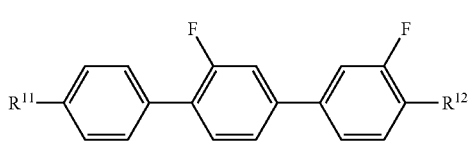

I-2e-1 in which $R^{11}$ has the meaning indicated above and preferably denotes $C_nH_{2n+1}$ or $CH_2$=CH—$(CH_2)_Z$, and $R^{12}$ has the meaning indicated above and preferably denotes $C_mH_{2m+1}$ or O—$C_mH_{2m+1}$ or $(CH_2)_Z$—CH=$CH_2$, and in which n and m, independently of one another, denote an integer in the range from 0 to 15, preferably in the range from 1 to 7 and particularly preferably 1 to 5, and z 0, 1, 2, 3 or 4, preferably 0 or 2.

The preferred combination of ($R^{11}$ and $R^{12}$) here is, in particular, ($C_nH_{2n+1}$ and O—$C_mH_{2m+1}$).

Preferred compounds of the formula I-2f are the compounds of the formula I-2f-1.

I-2f-1 in which $R^{11}$ has the meaning indicated above and preferably denotes $C_nH_{2n+1}$ or $CH_2$=CH—$(CH_2)_Z$, and $R^{12}$ has the meaning indicated above and preferably denotes $C_mH_{2m+1}$ or O—$C_mH_{2m+1}$ or $(CH_2)_Z$—CH=$CH_2$, and in which n and m, independently of one another, denote an integer in the range from 0 to 15, preferably in the range from 1 to 7 and particularly preferably 1 to 5, and z 0, 1, 2, 3 or 4, preferably 0 or 2.

The preferred combinations of ($R^{11}$ and $R^{12}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

Preferred compounds of the formula I-2g are the compounds of the formula I-2g-1:

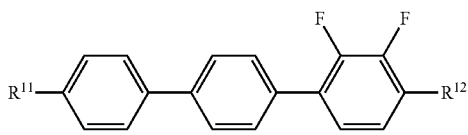

I-2g-1 in which
R$^{11}$ has the meaning indicated above and preferably denotes C$_n$H$_{2n+1}$ or CH$_2$=CH—(CH$_2$)$_Z$, and
R$^{12}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z 0, 1, 2, 3 or 4, preferably 0 or 2.

The preferred combinations of (R$^{11}$ and R$^{12}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and O—C$_m$H$_{2m+1}$).

The compounds of the formula II are preferably selected from the group of the compounds of the formulae II-1 to II-4, more preferably these compounds of the formula II predominantly consist, even more preferably essentially consist and very particularly preferably completely consist thereof:

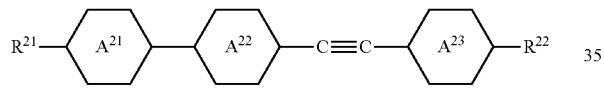

II-1

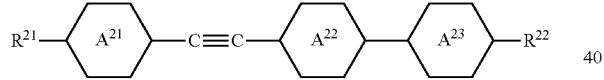

II-2

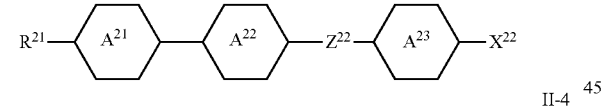

II-3

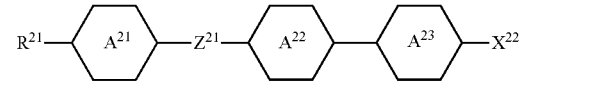

II-4 in which
Z$^{21}$ and Z$^{22}$ denote trans-CH=CH— or trans-CF=CF—, preferably trans-CH=CH—, and the other parameters have the meaning given above under formula II, and preferably
R$^{21}$ and R$^{22}$, independently of one another, denote H, unfluorinated alkyl or alkoxy having 1 to 7 C atoms or unfluorinated alkenyl having 2 to 7 C atoms,
X$^{22}$ denotes F, Cl, —CN or —NCS, preferably —NCS, and one of

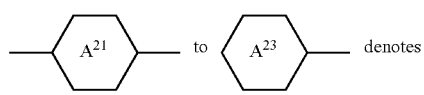

denotes

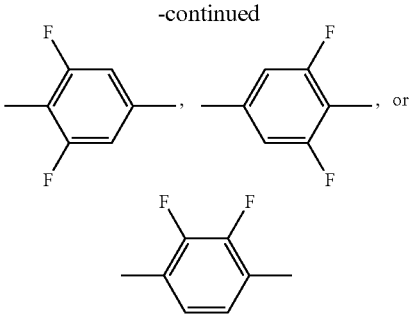

and the others, independently of one another, denote

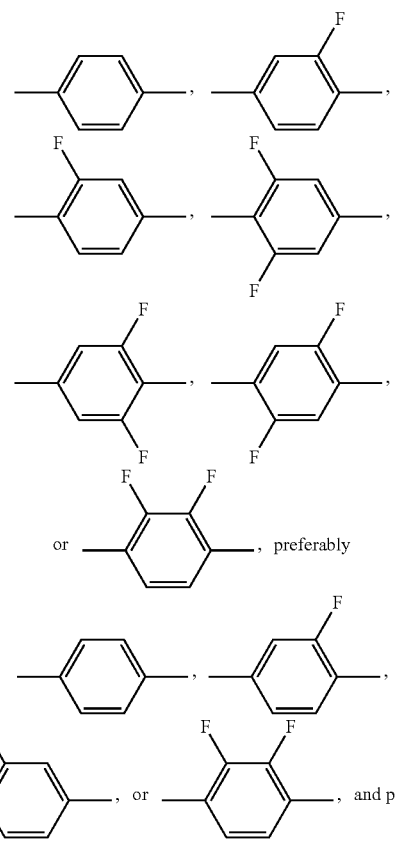

R$^{21}$ denotes C$_n$H$_{2n+1}$ or CH$_2$=CH—(CH$_2$)$_Z$, and
R$^{22}$ denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2,
and where the compounds of the formula II-2 are excluded from the compounds of the formula II-1.

The compounds of the formula II-1 are preferably selected from the group of the compounds of the formulae II-1a and II-1b, preferably selected from the group of the compounds of the formula II-1a, more preferably these compounds of the formula II-1 predominantly consist, even more preferably essentially consist and very particularly preferably completely consist thereof:

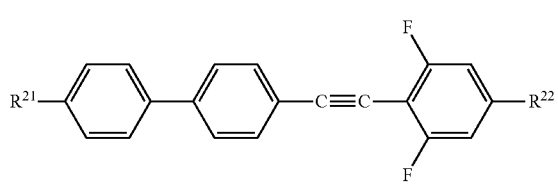

II-1a

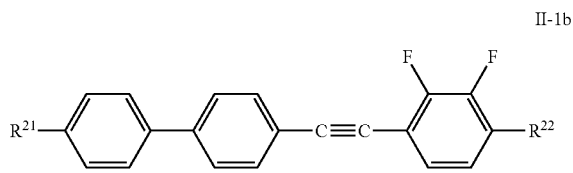

II-1b in which

R$^{21}$ has the meaning indicated above and preferably denotes C$_n$H$_{2n+1}$ or CH$_2$=CH—(CH$_2$)$_z$, and R$^{22}$ has the meaning indicated above and preferably denotes C$_m$H$_{2m+1}$ or O—C$_m$H$_{2m+1}$ or (CH$_2$)$_z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of (R$^{21}$ and R$^{22}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$) in the case of formula II-1a and particularly preferably (C$_n$H$_{2n+1}$ and O—C$_m$H$_{2m+1}$) in the case of formula II-1b.

The compounds of the formula II-2 are preferably compounds of the formula II-2a:

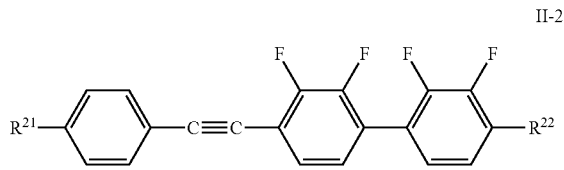

II-2a in which

R$^{21}$ has the meaning indicated above and preferably denotes C$_n$H$_{2n+1}$ or CH$_2$=CH—(CH$_2$)$_z$, and R$^{22}$ has the meaning indicated above and preferably denotes C$_m$H$_{2m+1}$ or O—C$_m$H$_{2m+1}$ or (CH$_2$)$_z$—CH=CH$_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of (R$^{21}$ and R$^{22}$) here are, in particular, (C$_n$H$_{2n+1}$ and C$_m$H$_{2m+1}$) and (C$_n$H$_{2n+1}$ and O—C$_m$H$_{2m+1}$).

The compounds of the formula II-3 are preferably compounds of the formula II-3a:

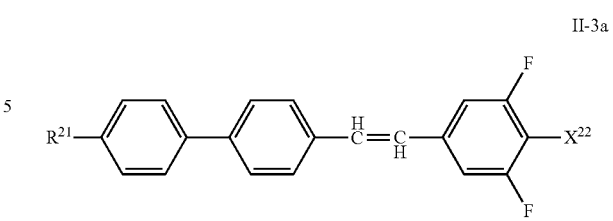

II-3a in which the parameters have the meanings indicated above for formula II-3 and preferably R$^{21}$ has the meaning indicated above and preferably denotes C$_n$H$_{2n+1}$) in which n denotes an integer in the range from 0 to 7, preferably in the range from 1 to 5, and X$^{22}$ denotes —F, —Cl, —OCF$_3$, —CN or —NCS, particularly preferably —NCS.

The compounds of the formula II-4 are preferably compounds of the formula II-4a:

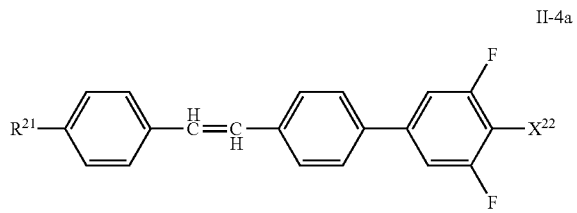

II-4a in which the parameters have the meanings indicated above for formula II-4 and preferably R$^{21}$ has the meaning indicated above and preferably denotes C$_n$H$_{2n+1}$, in which n denotes an integer in the range from 0 to 7, preferably in the range from 1 to 5, and X$^{22}$ denotes —F, —Cl, —OCF$_3$, —CN or —NCS, particularly preferably —NCS.

Further preferred compounds of the formula II are the compounds of the following formulae:

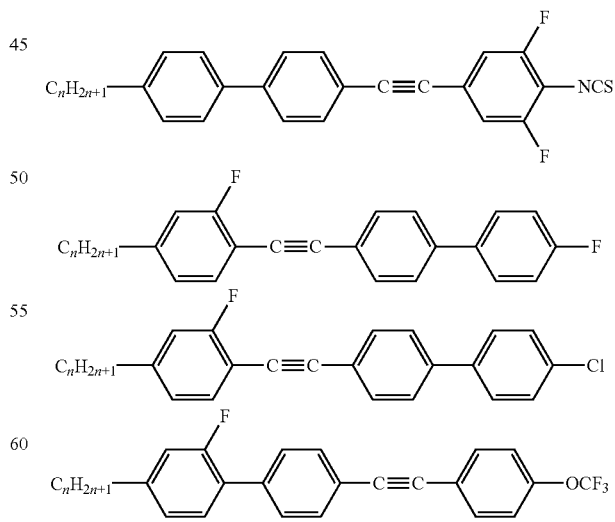

in which n denotes an integer in the range from 0 to 7, preferably in the range from 1 to 5.

The compounds of the formula III are preferably selected from the group of the compounds of the formulae III-1 to III-7, more preferably these compounds of the formula III predominantly consist, even more preferably essentially consist and very particularly preferably completely consist thereof:

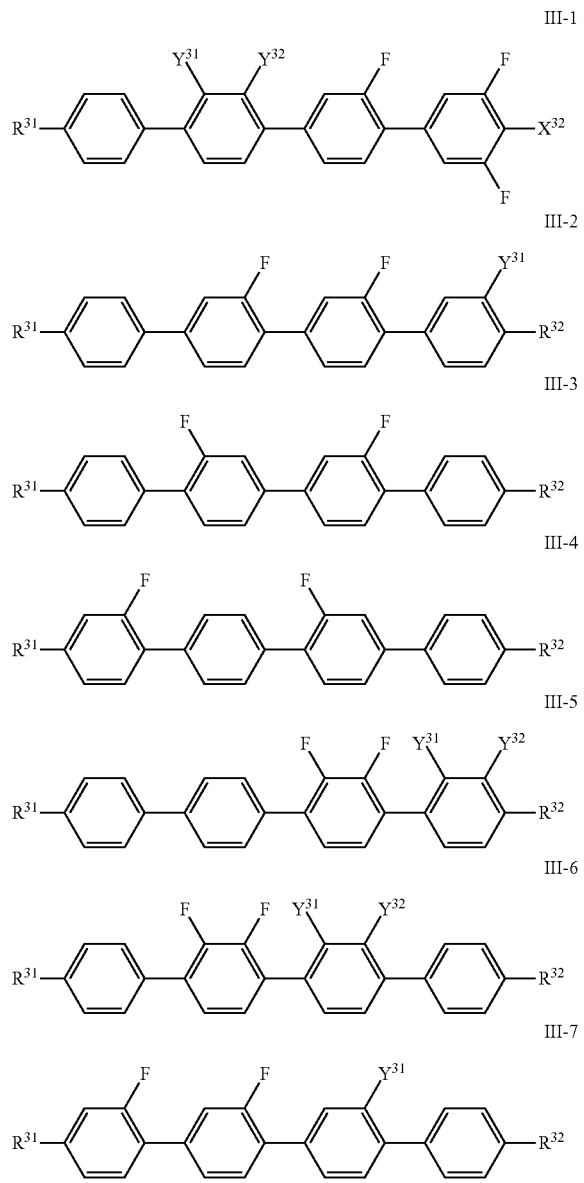

where the compounds of the formula III-5 are excluded from the compounds of the formula III-6, and
in which the parameters have the respective meanings indicated above for formula I and preferably
$R^{31}$ denotes unfluorinated alkyl or alkoxy, each having 1 to 7 C atoms, or unfluorinated alkenyl having 2 to 7 C atoms,
$R^{32}$ denotes unfluorinated alkyl or alkoxy, each having 1 to 7 C atoms, or unfluorinated alkenyl having 2 to 7 C atoms, and
$X^{32}$ denotes F, Cl, or —OCF$_3$, preferably F, and particularly preferably
$R^{31}$ has the meaning indicated above and preferably denotes $C_nH_{2n+1}$ or $CH_2$=CH—$(CH_2)_Z$, and $R^{32}$ has the meaning indicated above and preferably denotes $C_mH_{2m+1}$ or O—$C_mH_{2m+1}$ or $(CH_2)_Z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The compounds of the formula III-1 are preferably selected from the group of the compounds of the formulae III-1a to III-1d, more preferably these compounds of the formula III-1 predominantly consist, even more preferably essentially consist and very particularly preferably completely consist thereof:

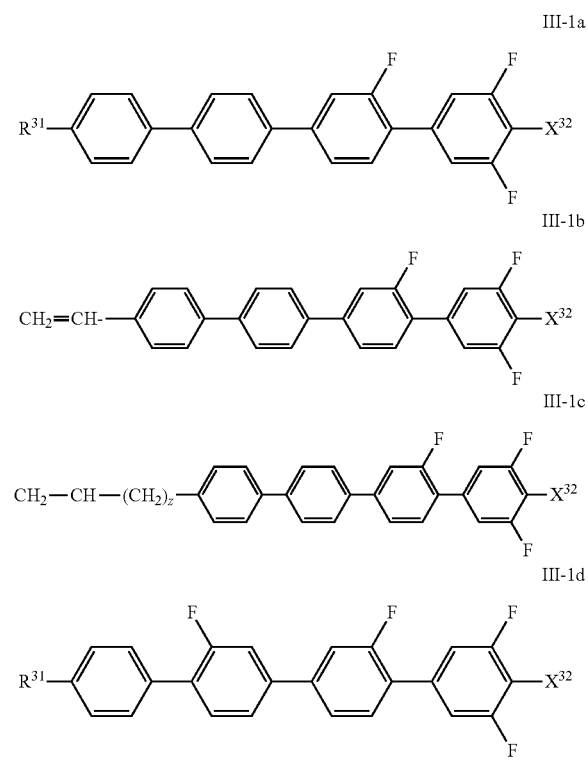

in which $X^{32}$ has the meaning given above for formula III-2 and
$R^{31}$ has the meaning indicated above and preferably denotes $C_nH_{2n+1}$, in which
n denotes 1 to 7, preferably 2 to 6, particularly preferably 2, 3 or 5, and
z denotes 0, 1, 2, 3 or 4, preferably 0 or 2, and
$X^{32}$ preferably denotes F.

The compounds of the formula III-2 are preferably selected from the group of the compounds of the formulae III-2a and III-2b, preferably of the formula III-2a, more preferably these compounds of the formula III-2 predominantly consist, even more preferably essentially consist and very particularly preferably completely consist thereof:

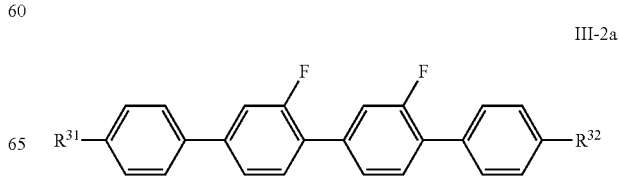

-continued

III-2b

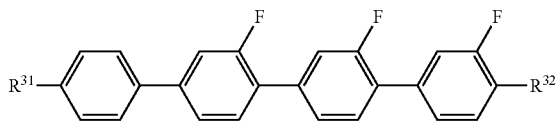

in which
R$^{31}$ has the meaning indicated above and preferably denotes
C$_n$H$_{2n+1}$ or CH$_2$=CH—(CH$_2$)$_z$, and
R$^{32}$ has the meaning indicated above and preferably denotes
C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-3 are preferably compounds of the formula III-3a:

III-3a

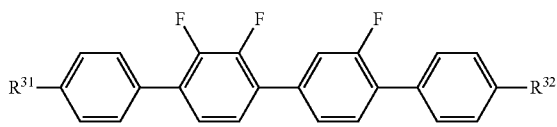

in which
R$^{31}$ has the meaning indicated above and preferably denotes
C$_n$H$_{2n+1}$ or CH$_2$=CH—(CH$_2$)$_z$, and
R$^{32}$ has the meaning indicated above and preferably denotes
C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-4 are preferably compounds of the formula III-4a:

III-4a

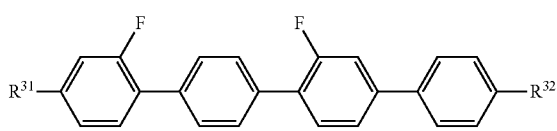

in which
R$^{31}$ has the meaning indicated above and preferably denotes
C$_n$H$_{2n+1}$ or CH$_2$=CH—(CH$_2$)$_z$, and
R$^{32}$ has the meaning indicated above and preferably denotes
C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-5 are preferably selected from the group of the compounds of the formulae III-5a and III-5b, preferably of the formula III-5a, more preferably these compounds of the formula III-5 predominantly consist, even more preferably essentially consist and very particularly preferably completely consist thereof:

III-5a

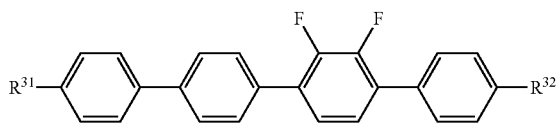

III-5b

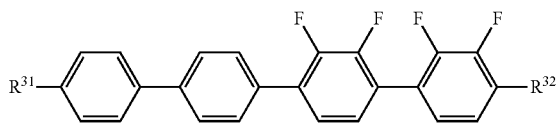

in which
R$^{31}$ has the meaning indicated above and preferably denotes
C$_n$H$_{2n+1}$ or CH$_2$=CH—(CH$_2$)$_z$, and
R$^{32}$ has the meaning indicated above and preferably denotes
C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula III-6 are preferably selected from the group of the compounds of the formulae III-6a and III-6b, more preferably these compounds of the formula III-6 predominantly consist, even more preferably essentially consist and very particularly preferably completely consist thereof:

III-6a

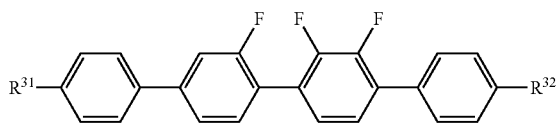

III-6b

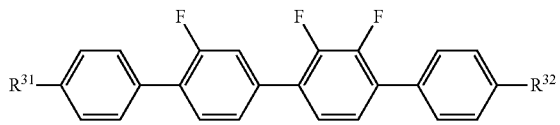

in which $R^{31}$ has the meaning indicated above and preferably denotes $C_nH_{2n+1}$ or $CH_2\!=\!CH\!-\!(CH_2)_Z$, and $R^{32}$ has the meaning indicated above and preferably denotes $C_mH_{2m+1}$ or $O\!-\!C_mH_{2m+1}$ or $(CH_2)_Z\!-\!CH\!=\!CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O\!-\!C_mH_{2m+1}$), particularly preferably ($C_nH_{2n+1}$ and $C_mH_{2m+1}$).

The media in accordance with the present invention optionally comprise one or more compounds of the formula IV

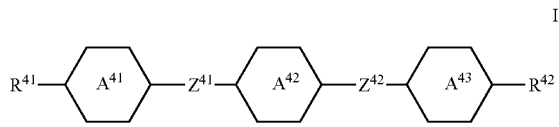

IV in which $R^{41}$ and $R^{42}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl, one of $Z^{41}$ and $Z^{42}$ denotes trans-CH=CH—, trans-CF=CF— or —C≡C— and the other denotes, independently thereof, trans-CH=CH—, trans-CF=CF— or a single bond, preferably one of them denotes —C≡C— or trans-CH=CH— and the other denotes a single bond, and

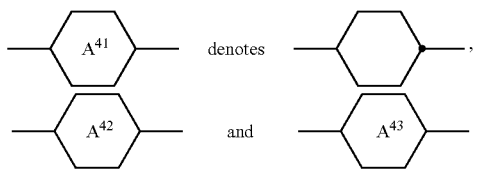

independently of one another, denote

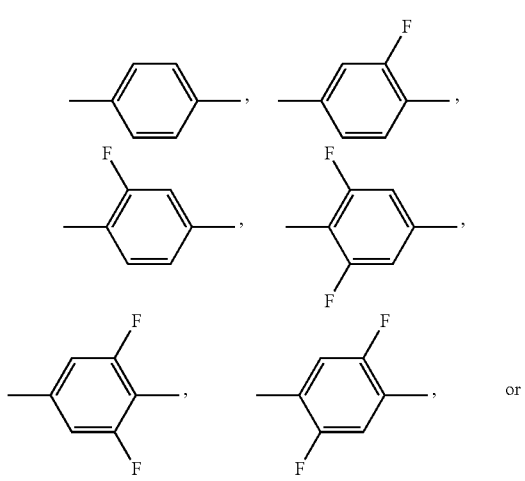

or

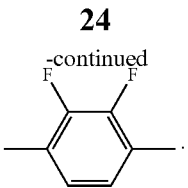

The liquid-crystalline media in accordance with the present application preferably comprise in total 0 to 40%, preferably 0 to 30% and particularly preferably 5 to 25%, of compounds of the formula IV.

The compounds of the formulae IV are preferably selected from the group of the compounds of the formulae IV-1 to IV-3, more preferably these compounds of the formula IV predominantly consist, even more preferably essentially consist and very particularly preferably completely consist thereof:

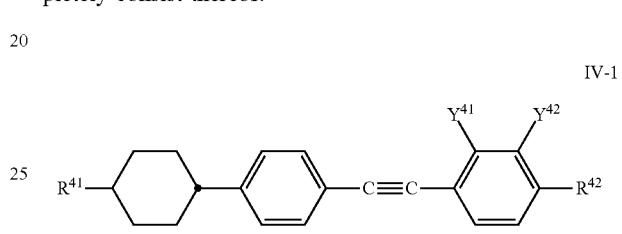

IV-1

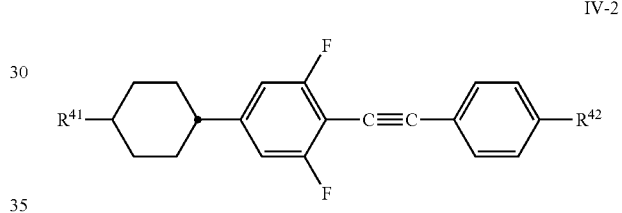

IV-2

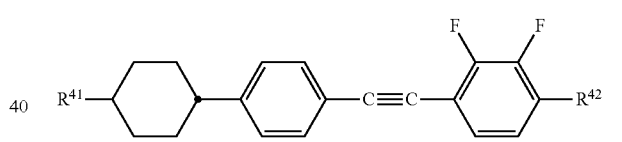

IV-3 in which one of $Y^{41}$ and $Y^{42}$ denotes H and the other denotes H or F, and $R^{41}$ has the meaning indicated above and preferably denotes $C_nH_{2n+1}$ or $CH_2\!=\!CH\!-\!(CH_2)_Z$, and $R^{42}$ has the meaning indicated above and preferably denotes $C_mH_{2m+1}$ or $O\!-\!C_mH_{2m+1}$ or $(CH_2)_Z\!-\!CH\!=\!CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$) and ($C_nH_{2n+1}$ and $O\!-\!C_mH_{2m+1}$), particularly preferably ($C_nH_{2n+1}$ and $C_mH_{2m+1}$).

The compounds of the formulae IV-1 are preferably selected from the group of the compounds of the formulae IV-1a to IV-1c, more preferably these compounds of the formula IV-1 predominantly consist, even more preferably essentially consist and very particularly preferably completely consist thereof:

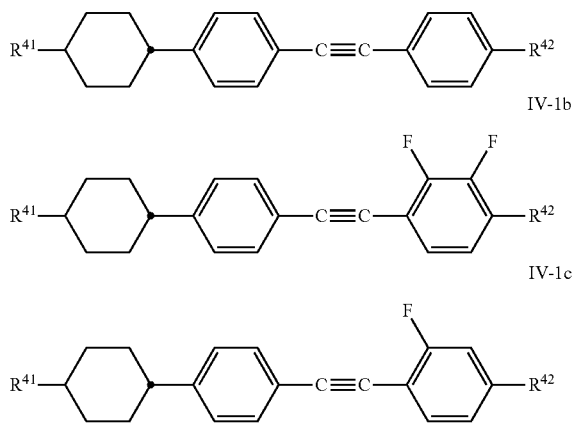

in which
R$^{41}$ has the meaning indicated above and preferably denotes C$_n$H$_{2n+1}$ or CH$_2$=CH—(CH$_2$)$_Z$, and
R$^{42}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{41}$ and R$^{42}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula IV-2 are preferably compounds of the formula IV-2a:

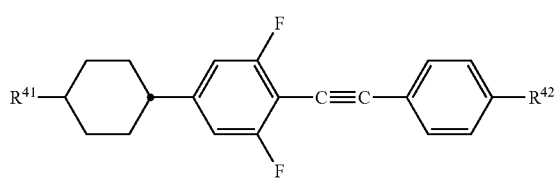

in which
R$^{41}$ has the meaning indicated above and preferably denotes C$_n$H$_{2n+1}$ or CH$_2$=CH—(CH$_2$)$_Z$, and
R$^{42}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{41}$ and R$^{42}$) here are, in particular, (C$_n$H$_{2n+1}$ and C$_m$H$_{2m+1}$), C$_n$H$_{2n+1}$ and O—C$_m$H$_{2m+1}$) and (CH$_2$=CH—(CH$_2$)$_Z$ and C$_m$H$_{2m+1}$), particularly preferably (C$_n$H$_{2n+1}$ and C$_m$H$_{2m+1}$).

The compounds of the formula IV-3 are preferably compounds of the formula IV-3a:

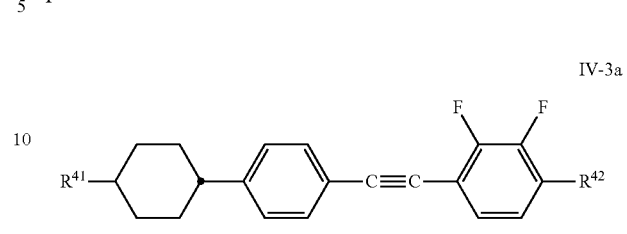

in which
R$^{41}$ has the meaning indicated above and preferably denotes C$_n$H$_{2n+1}$ or CH$_2$=CH—(CH$_2$)$_Z$, and
R$^{42}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{41}$ and R$^{42}$) here are, in particular, (C$_n$H$_{2n+1}$ and C$_m$H$_{2m+1}$) and (C$_n$H$_{2n+1}$ and O—C$_m$H$_{2m+1}$).

The media in accordance with the present invention optionally comprise one or more compounds of the formula V

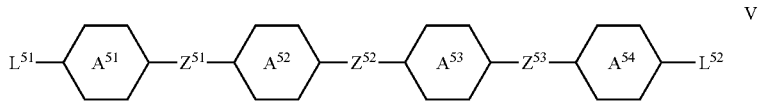

in which
L$^{51}$ denotes R$^{51}$ or X$^{51}$,
L$^{52}$ denotes R$^{52}$ or X$^{52}$,
R$^{51}$ and R$^{52}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl,
X$^{51}$ and X$^{52}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and
Z$^{51}$ to Z$^{53}$, independently of one another, denote trans-CH=CH—, trans-CF=CF—, —C≡C— or a single bond, preferably one or more of them denotes a single bond, and particularly preferably all denote a single bond,

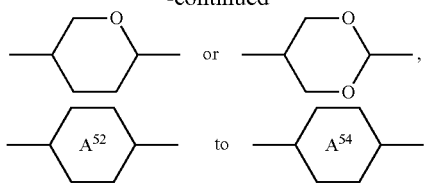

independently of one another, denote

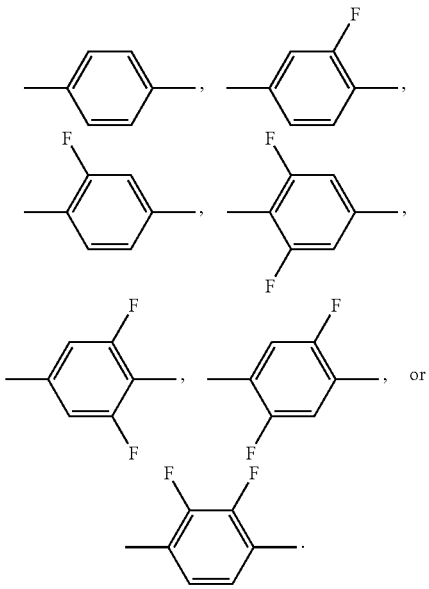

The compounds of the formula V are preferably selected from the group of the compounds of the formulae V-1 to V-3, more preferably these compounds of the formula V predominantly consist, even more preferably essentially consist and very particularly preferably completely consist thereof:

V-1
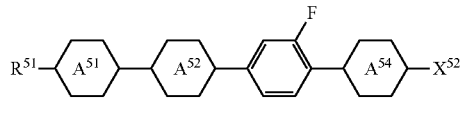

V-2
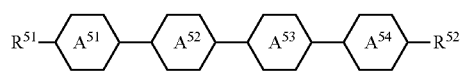

V-3
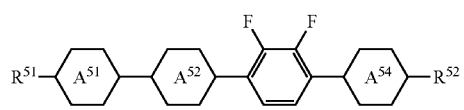

in which the parameters have the respective meanings indicated above under formula V and preferably one of

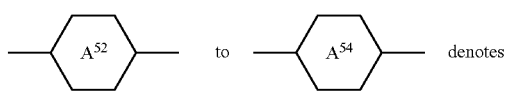 denotes

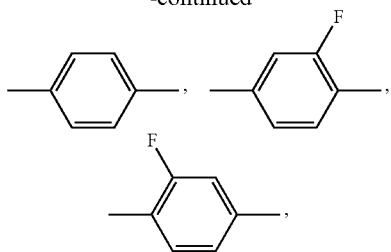

and
in which
$R^{51}$ has the meaning indicated above and preferably denotes $C_nH_{2n+1}$ or $CH_2=CH-(CH_2)_Z$, and
$R^{52}$ has the meaning indicated above and preferably denotes $C_mH_{2m+1}$ or $O-C_mH_{2m+1}$ or $(CH_2)_Z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and $O-C_mH_{2m+1}$).

The liquid-crystalline media in accordance with the present application preferably comprise in total 5 to 30%, preferably 10 to 25% and particularly preferably 15 to 20%, of compounds of the formula V.

The compounds of the formula V-1 are preferably selected from the group of the compounds of the formulae V-1a to V-1e, more preferably these compounds of the formula V-1 predominantly consist, even more preferably essentially consist and very particularly preferably completely consist thereof:

V-1a
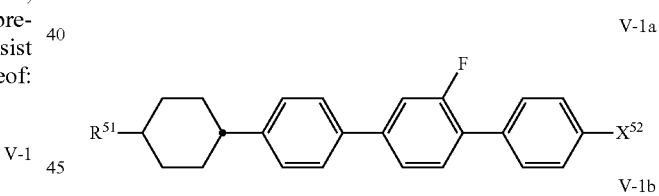

V-1b

V-1c
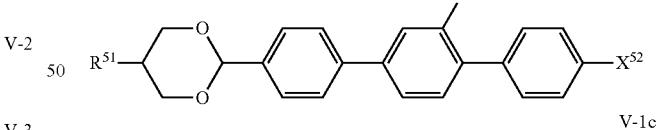

V-1d

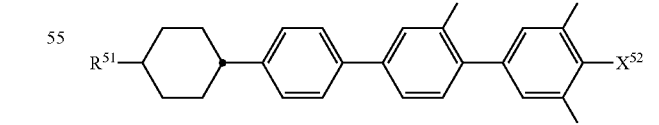

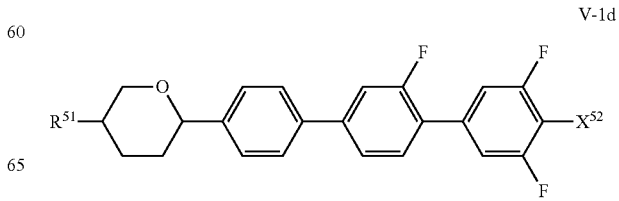

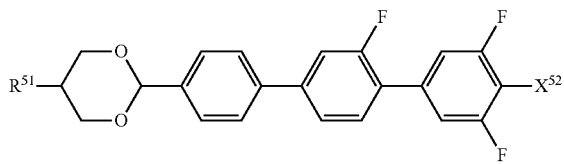

in which the parameters have the meaning given above and preferably
$R^{51}$ has the meaning indicated above and preferably denotes $C_nH_{2n+1}$, and
n denotes an integer in the range from 0 to 15, preferably in the range from 1 to 7 and particularly preferably 1 to 5, and
$X^{52}$ preferably denotes F or Cl.

The compounds of the formula V-2 are preferably selected from the group of the compounds of the formulae V-2a and V-2b, more preferably these compounds of the formula V-2 predominantly consist, even more preferably essentially consist and very particularly preferably completely consist thereof:

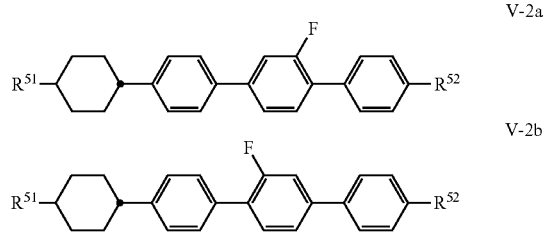

in which
$R^{51}$ has the meaning indicated above and preferably denotes $C_nH_{2n+1}$ or $CH_2=CH-(CH_2)_z$, and
$R^{52}$ has the meaning indicated above and preferably denotes $C_mH_{2m+1}$ or $O-C_mH_{2m+1}$ or $(CH_2)_z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{51}$ and $R^{52}$) here is, in particular, ($C_nH_{2n+1}$ and $C_mH_{2m+1}$).

The compounds of the formula V-3 are preferably compounds of the formulae V-3a and V-3b:

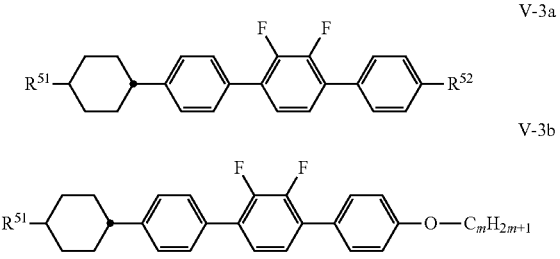

in which
$R^{51}$ has the meaning indicated above and preferably denotes $C_nH_{2n+1}$ or $CH_2=CH-(CH_2)_z$, and
$R^{52}$ has the meaning indicated above and preferably denotes $C_mH_{2m+1}$ or $O-C_mH_{2m+1}$ or $(CH_2)_z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $O-C_mH_{2m+1}$).

In a preferred embodiment of the present invention, the medium comprises one or more dielectrically positive compounds of the formula I-1 having a dielectric anisotropy of greater than 3.

The medium preferably comprises one or more dielectrically neutral compounds of the formula I-2 having a dielectric anisotropy in the range from more than −1.5 to 3.

In a preferred embodiment of the present invention, the medium comprises one or more compounds of the formula II.

In a further preferred embodiment of the present invention, the medium comprises one or more compounds of the formula III.

The liquid-crystalline media in accordance with the present invention preferably comprise 10% or less, preferably 5% or less, particularly preferably 2% or less, very particularly preferably 1% or less, and in particular absolutely no compound having only two or fewer five- and/or six-membered rings.

The definitions of the abbreviations (acronyms) are likewise indicated below in Table D or are evident from Tables A to C.

The liquid-crystalline media in accordance with the present invention preferably comprise, more preferably predominantly consist of, even more preferably essentially consist of and very preferably completely consist of compounds selected from the group of the compounds of the formulae I to V, preferably I to IV and very preferably I to III and/or V.

In this application, comprise in connection with compositions means that the entity in question, i.e. the medium or the component, comprises the component or components or compound or compounds indicated, preferably in a total concentration of 10% or more and very preferably 20% or more.

In this connection, predominantly consist of means that the entity in question comprises 55% or more, preferably 60% or more and very preferably 70% or more of the component or components or compound or compounds indicated.

In this connection, essentially consist of means that the entity in question comprises 80% or more, preferably 90% or more and very preferably 95% or more of the component or components or compound or compounds indicated.

In this connection, completely consist of means that the entity in question comprises 98% or more, preferably 99% or more and very preferably 100.0% of the component or components or compound or compounds indicated.

Other mesogenic compounds which are not explicitly mentioned above can optionally and advantageously also be used in the media in accordance with the present invention. Such compounds are known to the person skilled in the art.

The liquid-crystal media in accordance with the present invention preferably have a clearing point of 90° C. or more, more preferably 100° C. or more, still more preferably 120°

C. or more, particularly preferably 150° C. or more and very particularly preferably 170° C. or more.

The nematic phase of the media in accordance with the invention preferably extends at least from 20° C. or less to 90° C. or more, preferably up to 100° C. or more, more preferably at least from 0° C. or less to 120° C. or more, very preferably at least from −10° C. or less to 140° C. or more and in particular at least from −20° C. or less to 150° C. or more.

The $\Delta\epsilon$ of the liquid-crystal medium in accordance with the invention, at 1 kHz and 20° C., is preferably 1 or more, more preferably 2 or more and very preferably 3 or more.

The $\Delta n$ of the liquid-crystal media in accordance with the present invention, at 589 nm ($Na^D$) and 20° C., is preferably in the range from 0.200 or more to 0.90 or less, more preferably in the range from 0.250 or more to 0.90 or less, even more preferably in the range from 0.300 or more to 0.85 or less and very particularly preferably in the range from 0.350 or more to 0.800 or less.

In a first preferred embodiment of the present application, the $\Delta n$ of the liquid-crystal media in accordance with the present invention is preferably 0.50 or more, more preferably 0.55 or more.

In accordance with the present invention, the individual compounds of the formula I are preferably used in a total concentration of 10% to 70%, more preferably 20% to 60%, even more preferably 30% to 50% and very preferably 25% to 45% of the mixture as a whole.

The compounds of the formula II are preferably used in a total concentration of 1% to 20%, more preferably 1% to 15%, even more preferably 2% to 15% and very preferably 3% to 10% of the mixture as a whole.

The compounds of the formula III are preferably used in a total concentration of 1% to 60%, more preferably 5% to 50%, even more preferably 10% to 45% and very preferably 15% to 40% of the mixture as a whole.

The liquid-crystal media preferably comprise, preferably predominantly consist of and very preferably completely consist of in total 50% to 100%, more preferably 70% to 100% and very preferably 80% to 100% and in particular 90% to 100% of the compounds of the formulae I, II, III, IV and V, preferably of the formulae I, III, IV and V, more preferably of the formulae I, II, III, IV and/or VI.

In the present application, the expression dielectrically positive describes compounds or components where $\Delta\epsilon>3.0$, dielectrically neutral describes those where $-1.5\leq\Delta\epsilon\leq3.0$ and dielectrically negative describes those where $\Delta\epsilon<-1.5$. $\Delta\epsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\epsilon$ is defined as $(\epsilon_{\parallel}-\epsilon_{\perp})$, while $\epsilon_{ave.}$ is $(\epsilon_{\parallel}+2\epsilon_{\perp})/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\epsilon$) is determined at a frequency of 1 kHz. The threshold voltages, as well as all other electro-optical properties, are determined using test cells produced at Merck KGaA, Germany. The test cells for the determination of $\Delta\epsilon$ have a cell thickness of approximately 20 μm. The electrode is a circular ITO electrode having an area of 1.13 cm$^2$ and a guard ring. The orientation layers are SE-1211 from Nissan Chemicals, Japan, for homeotropic orientation ($\epsilon_{\parallel}$) and polyimide AL-1054 from Japan Synthetic Rubber, Japan, for homogeneous orientation ($\epsilon_{\perp}$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystalline media are investigated with respect to their properties in the microwave frequency range as described in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548.

Compare in this respect also A. Gaebler, F. Gölden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) capillary. The capillary has an internal radius of 180 μm and an external radius of 350 μm. The effective length is 2.0 cm. The filled capillary is introduced into the centre of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterization of Liquid Crystals up to 35 GHz", $34^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnets is set correspondingly and then rotated correspondingly through 90°.

Preferred components are phase shifters, varactors, wireless and radio wave antenna arrays, matching circuit adaptive filters and others.

In the present application, the term compounds is taken to mean both one compound and a plurality of compounds, unless expressly stated otherwise.

The liquid-crystal media according to the invention preferably have nematic phases of in each case at least from −20° C. to 80° C., preferably from −30° C. to 85° C. and very particularly preferably from −40° C. to 100° C. The phase particularly preferably extends to 120° C. or more, preferably to 140° C. or more and very particularly preferably to 180° C. or more. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a layer thickness of 5 μm for at least 100 hours. At high temperatures, the clearing point is measured in capillaries by conventional methods.

Furthermore, the liquid-crystal media according to the invention are characterised by high optical anisotropy values. The birefringence at 589 nm is preferably 0.20 or more, particularly preferably 0.25 or more, particularly preferably 0.30 or more, particularly preferably 0.40 or more and very particularly preferably 0.45 or more. In addition, the birefringence is preferably 0.80 or less.

The liquid crystals employed preferably have a positive dielectric anisotropy. This is preferably 2 or more, preferably 4 or more, particularly preferably 6 or more and very particularly preferably 10 or more.

Furthermore, the liquid-crystal media according to the invention are characterised by high anisotropy values in the microwave range. The birefringence at about 8.3 GHz is, for example, preferably 0.14 or more, particularly preferably 0.15 or more, particularly preferably 0.20 or more, particularly preferably 0.25 or more and very particularly preferably 0.30 or more. In addition, the birefringence is preferably 0.80 or less.

The material quality η(μ-waves)/tan(δ) of the preferred liquid-crystal materials is 5 or more, preferably 6 or more, preferably 8 or more, preferably 10 or more, preferably 15 or more, preferably 17 or more, particularly preferably 20 or more and very particularly preferably 25 or more.

The preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

In some embodiments, however, liquid crystals having a negative value of the dielectric anisotropy can also advantageously be used.

The liquid crystals employed are either individual substances or mixtures. They preferably have a nematic phase.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

Compounds containing a vinyl end group and compounds containing a methyl end group have low rotational viscosity.

In the present application, both high-frequency technology and hyper-frequency technology denote applications having frequencies in the range from 1 MHz to 1 THz, preferably from 1 GHz to 500 GHz, more preferably 2 GHz to 300 GHz, particularly preferably from about 5 to 150 GHz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, respectively, in each case having n, m or l C atoms. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

Ring elements

C

D  DI

A  AI

P

G  GI

TABLE A-continued

Ring elements

U  UI

Y

M  MI

N  NI

Np

N3f  N3fI tH  tHI tH2f  tH2fI

TABLE A-continued

Ring elements dH, K, KI, L, LI, F (two fluorinated cyclohexene ring elements shown, labeled with F markers)

TABLE B

Linking groups

| E | —CH$_2$CH$_2$— | Z | —CO—O— |
|---|---|---|---|
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | | |

TABLE C

End groups

| Left-hand side | | Right-hand side | |
|---|---|---|---|
| Use alone | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Use together with others | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots "..." are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

The illustrative structures are compounds having three 6-membered rings which are particularly preferably employed:

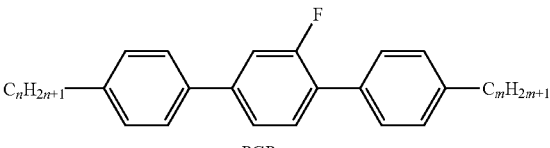
PGP-n-m

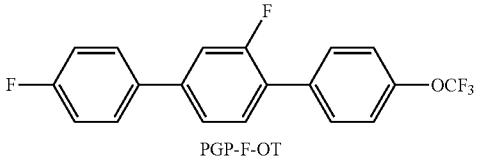 [SMILES: Fc1ccc(-c2ccc(-c3ccc(OC(F)(F)F)cc3)c(F)c2)cc1]
PGP-F-OT

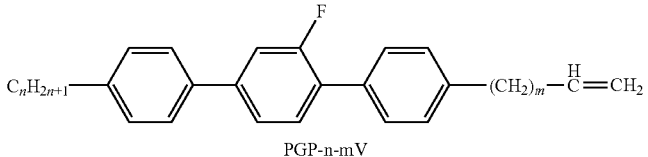
PGP-n-mV

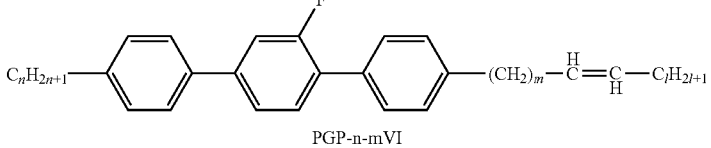
PGP-n-mVI

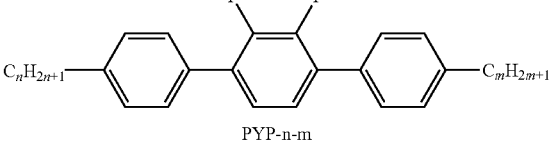
PYP-n-m

GGP-n-F

GGP-n-CL

TABLE D-continued
Illustrative structures
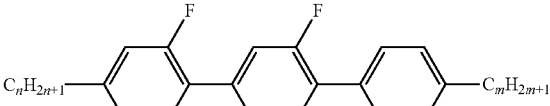
GGP-n-m
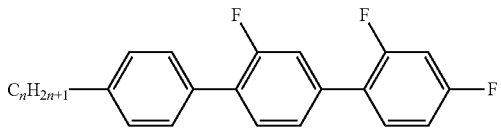
PGIGI-n-F
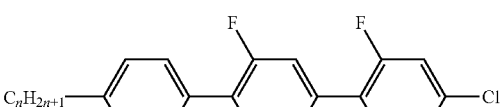
PGIGI-n-CL
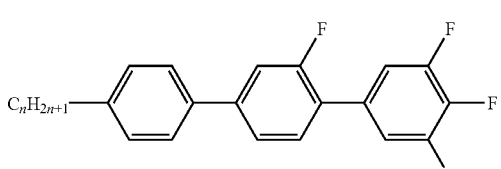
PGU-n-F
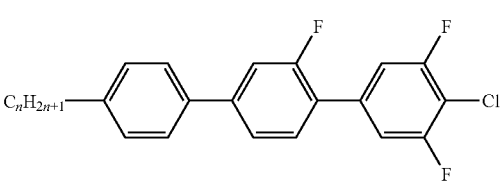
PGU-n-CL
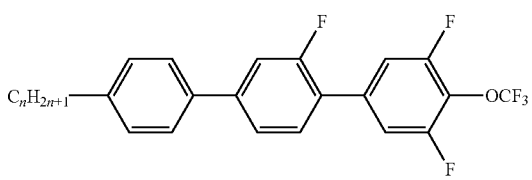
PGU-n-OT
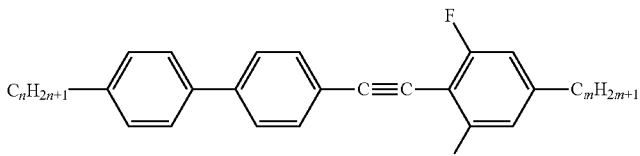
PPTUI-n-m
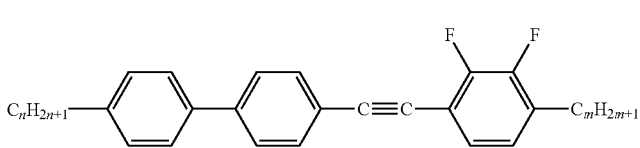
PPTY-n-m TABLE D-continued
Illustrative structures
The illustrative structures are compounds having four 6-membered rings which are particularly preferably employed:
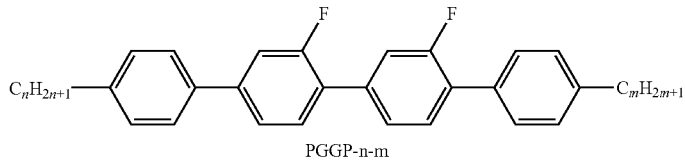
PGGP-n-m
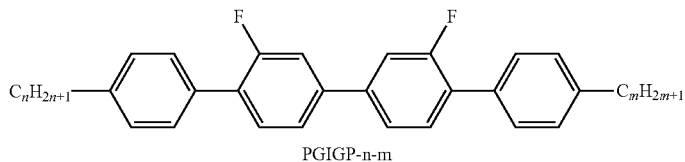
PGIGP-n-m
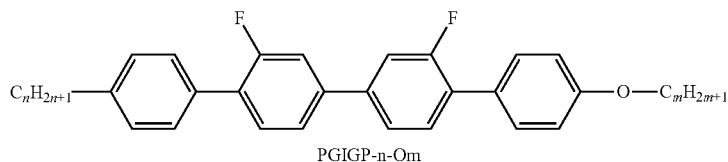
PGIGP-n-Om
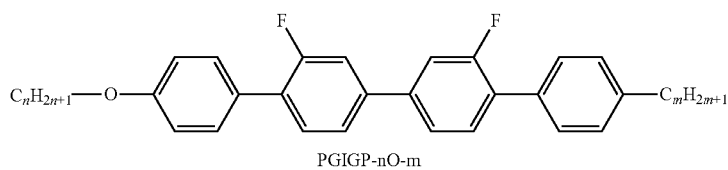
PGIGP-nO-m
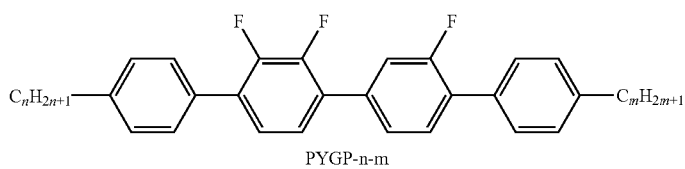
PYGP-n-m
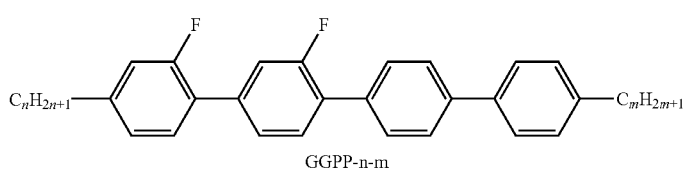
GGPP-n-m
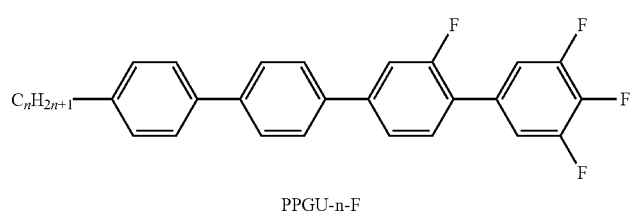
PPGU-n-F
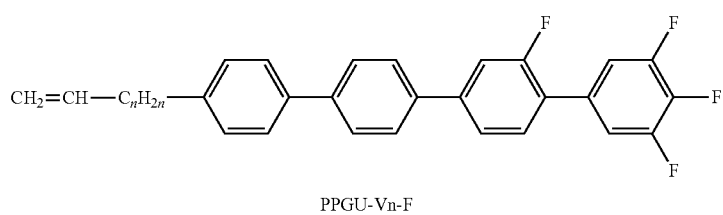
PPGU-Vn-F TABLE D-continued
Illustrative structures
Illustrative structures of dielectrically neutral compounds which are preferably employed:
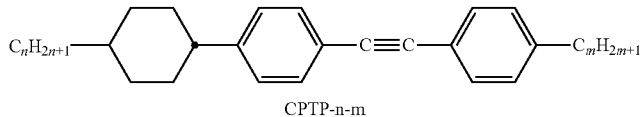
CPTP-n-m
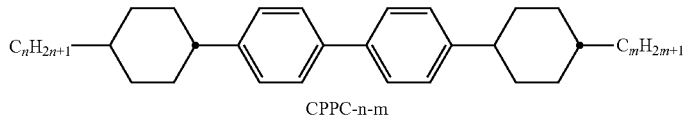
CPPC-n-m
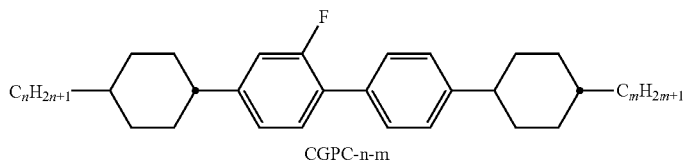
CGPC-n-m
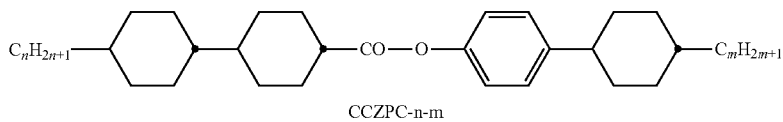
CCZPC-n-m
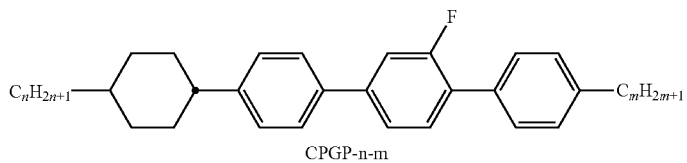
CPGP-n-m
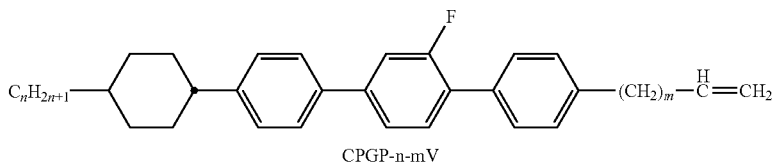
CPGP-n-mV
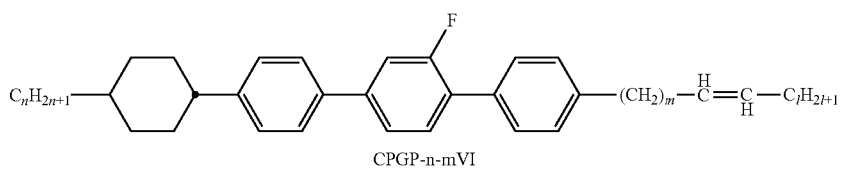
CPGP-n-mVI
Illustrative structures of further compounds which are preferably employed:
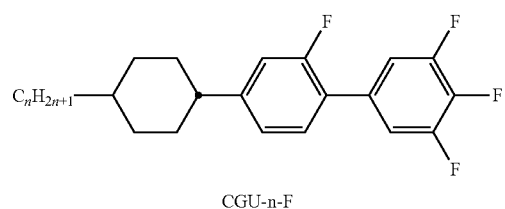
CGU-n-F TABLE D-continued
Illustrative structures
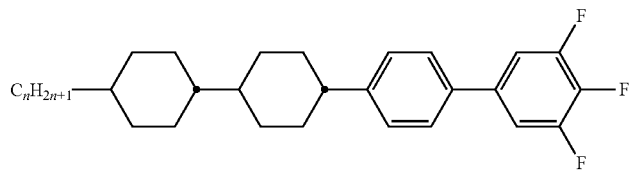
CCPU-n-F
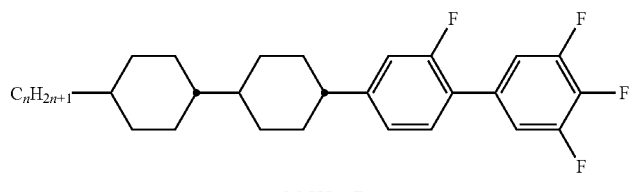
CCGU-n-F
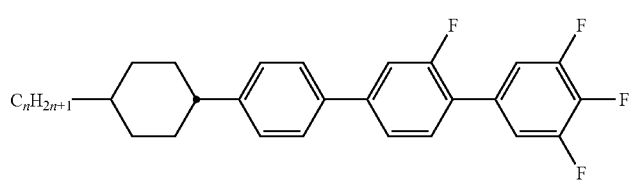
CPGU-n-F
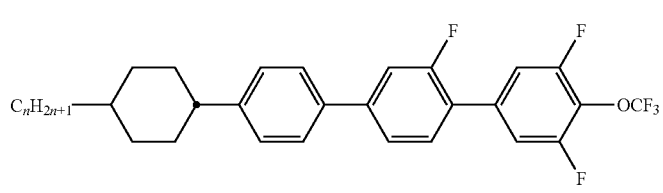
CPGU-n-OT
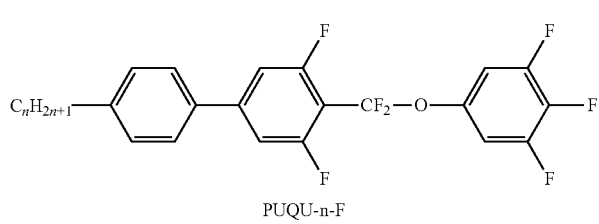
PUQU-n-F
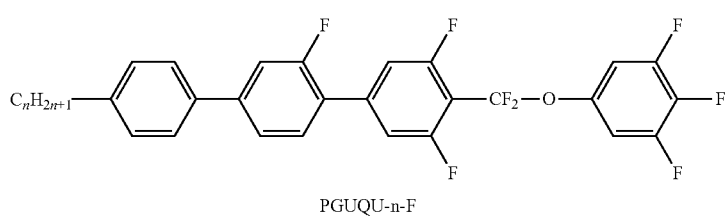
PGUQU-n-F
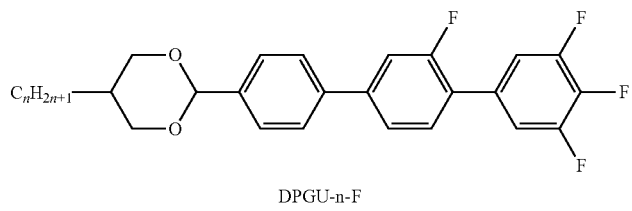
DPGU-n-F TABLE D-continued
Illustrative structures
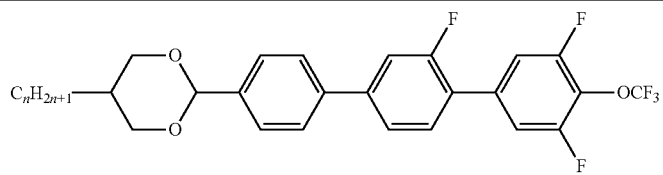
DPGU-n-OT
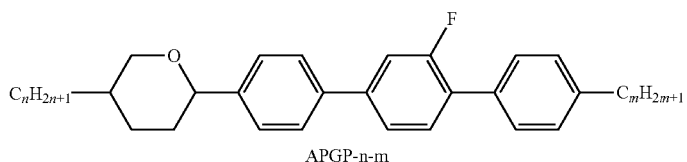
APGP-n-m
The following table, Table E, shows illustrative compounds which can be used as stabiliser in the mesogenic media in accordance with the present invention. The total concentration of these and similar compounds in the media is preferably 5% or less.
TABLE E
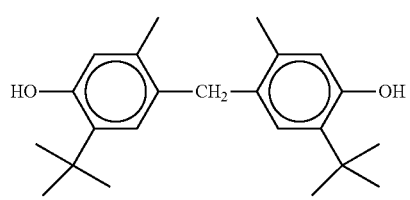
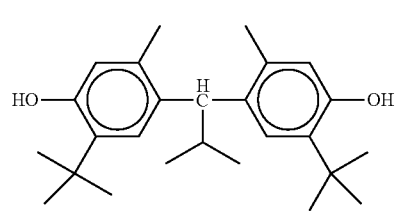
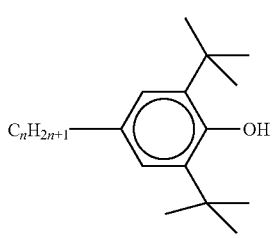
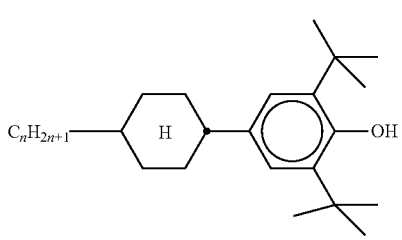
TABLE E-continued
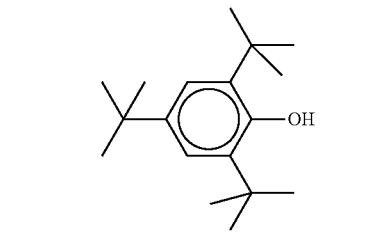
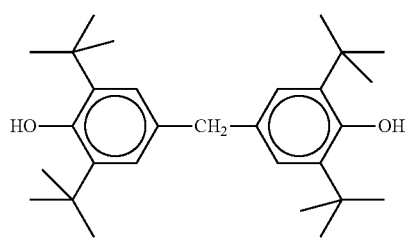
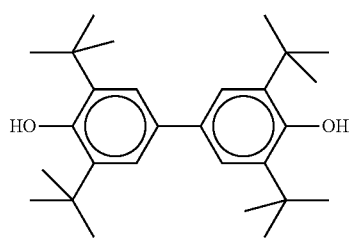

TABLE E-continued
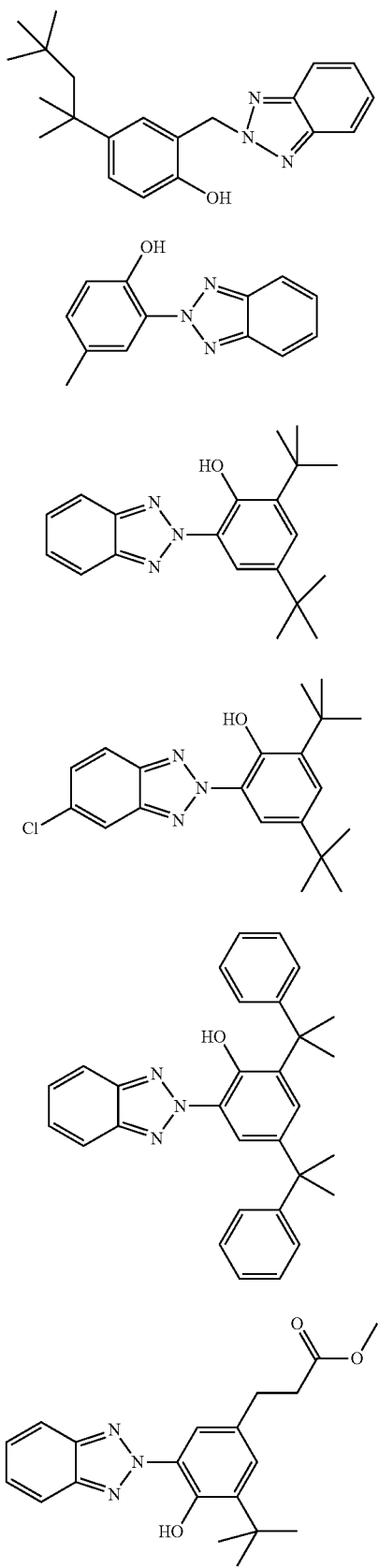
TABLE E-continued
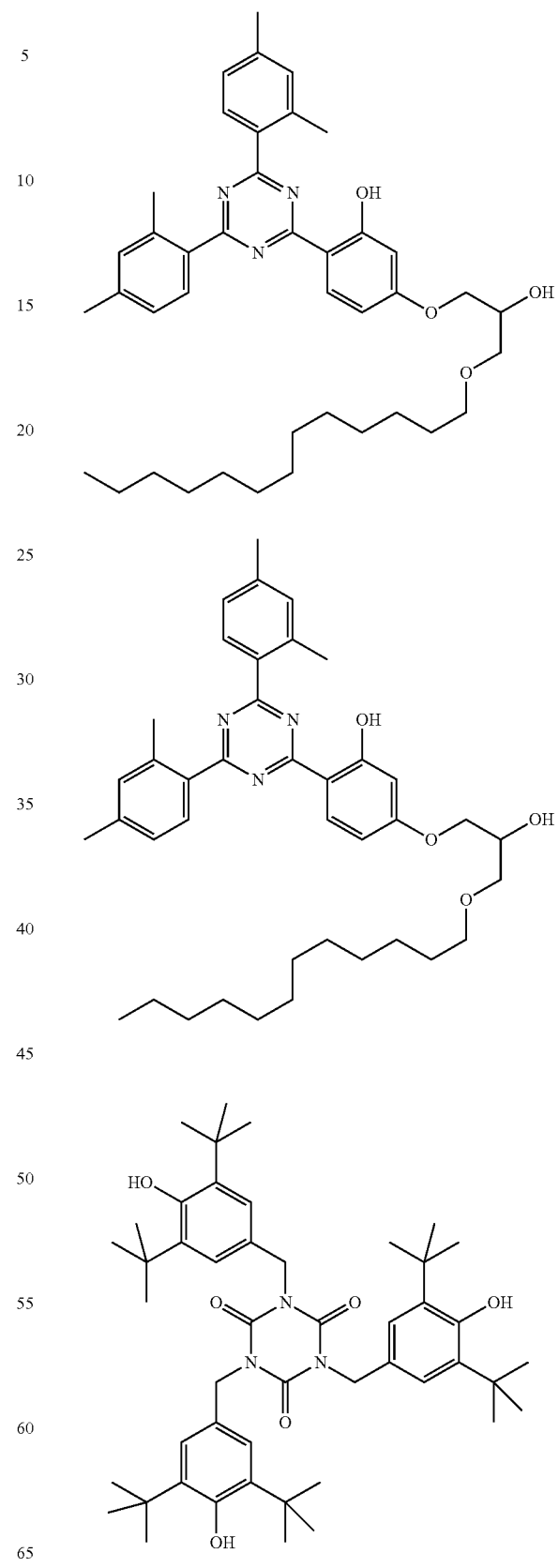

TABLE E-continued
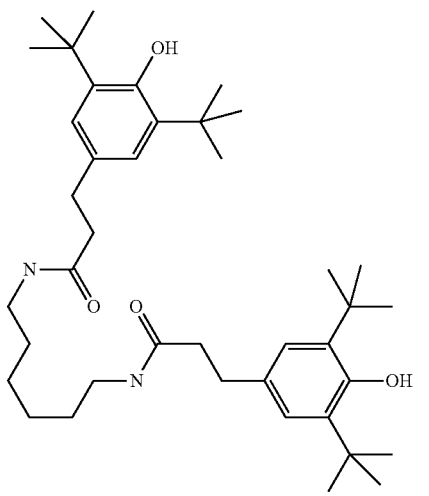 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
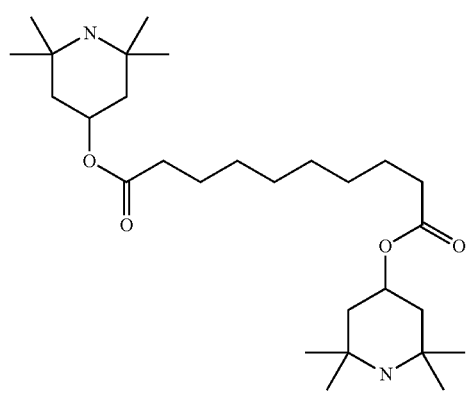
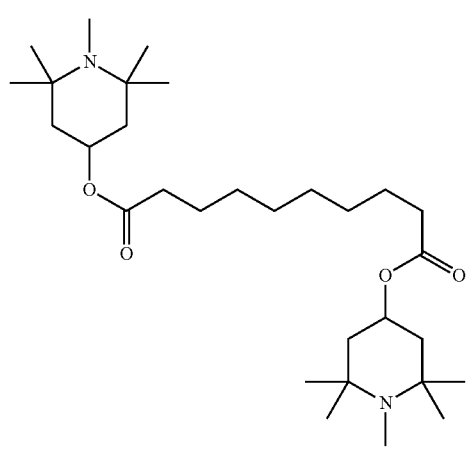
TABLE E-continued
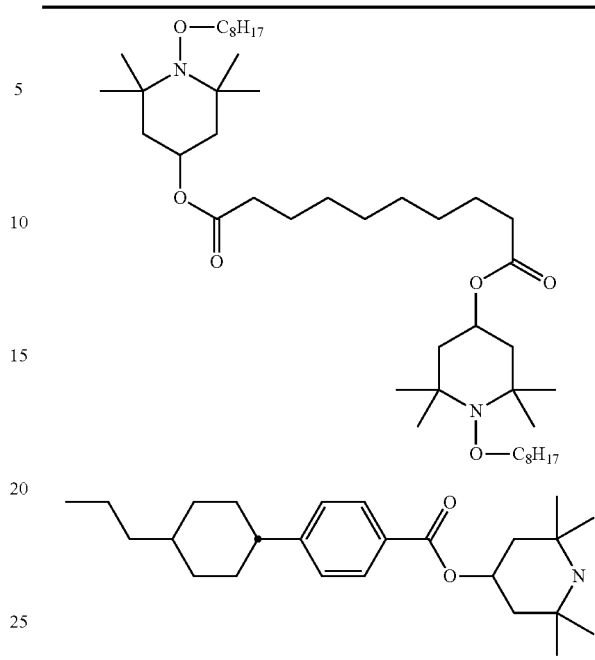
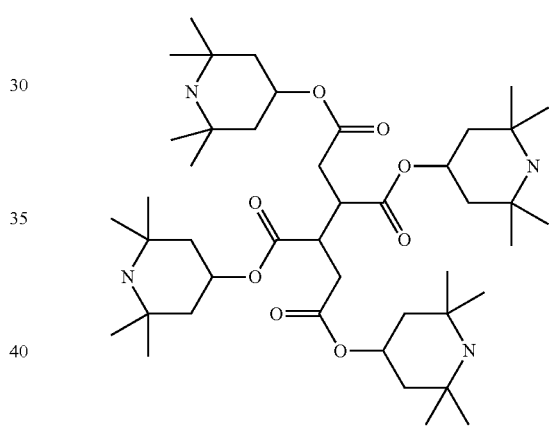
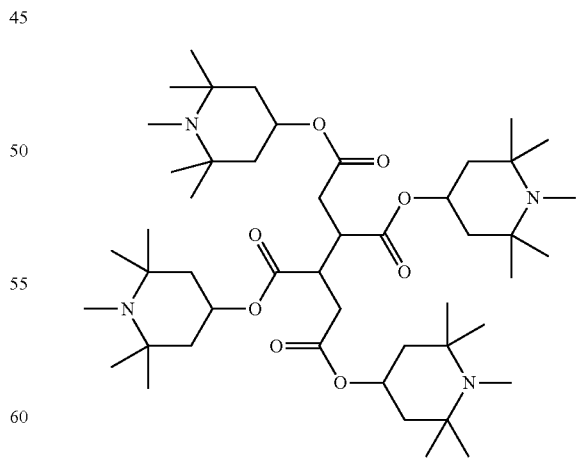
In a preferred embodiment of the present invention, the mesogenic media comprise one or more compounds selected from the group of the compounds from Table E.

The following table, Table F, shows illustrative compounds which can preferably be used as chiral dopants in the mesogenic media in accordance with the present invention.
TABLE F
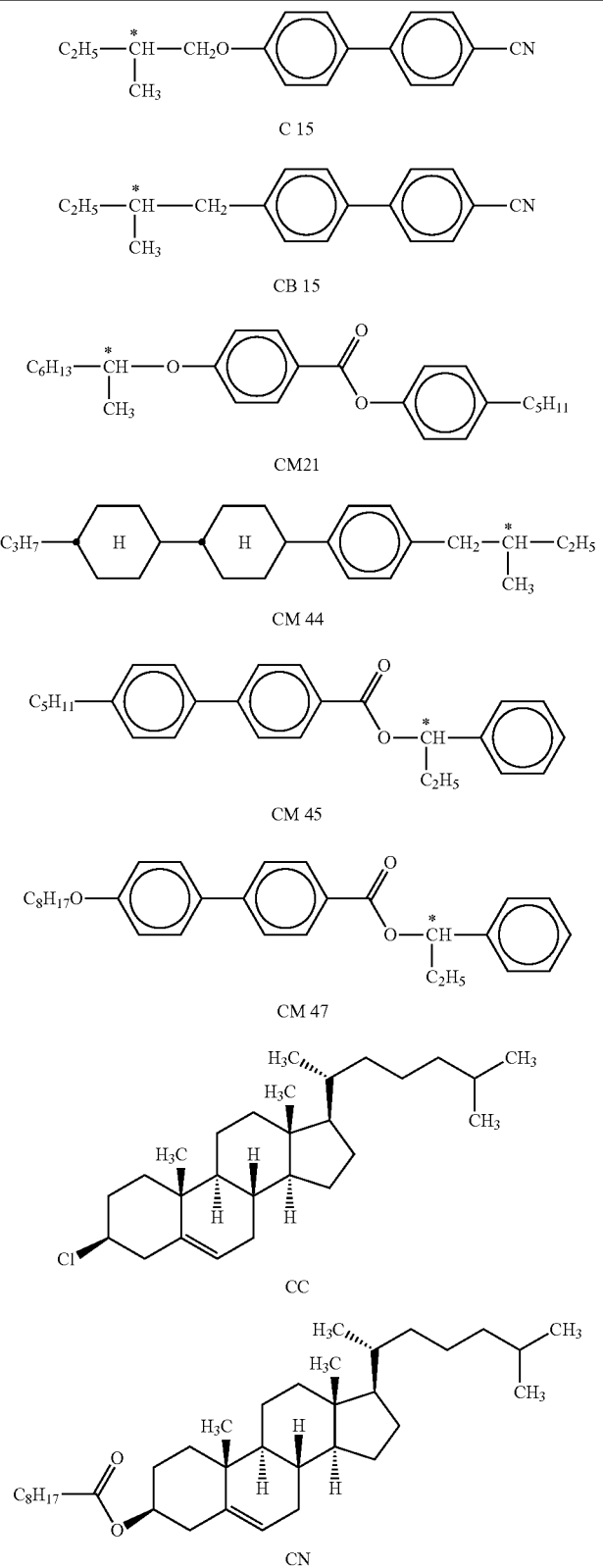

TABLE F-continued
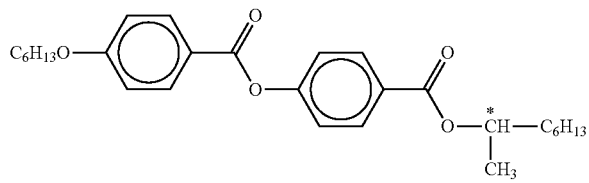
R/S-811
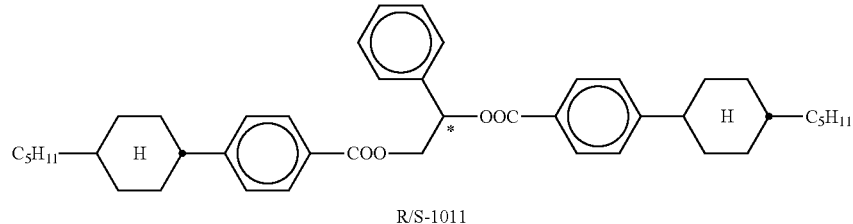
R/S-1011
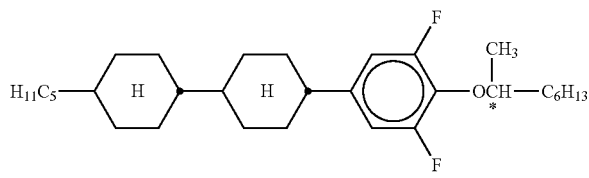
R/S-2011
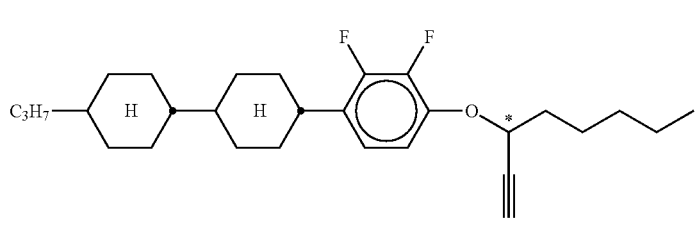
R/S-3011
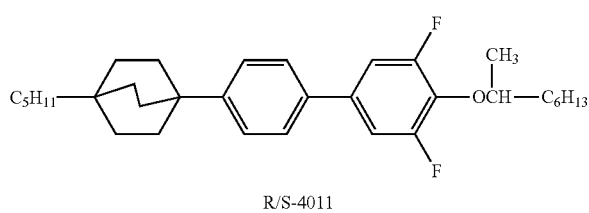
R/S-4011
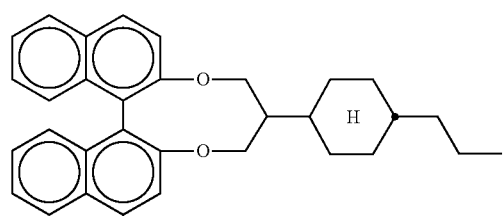
R/S-5011

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise
  seven or more, preferably eight or more, compounds, preferably compounds having three or more, preferably four or more, different formulae, selected from the group of the compounds from Table D.

EXAMPLES

The following examples illustrate the present invention without limiting it in any way.

However, it is clear to the person skilled in the art from the physical properties what properties can be achieved and in what ranges they can be modified. In particular, the combination of the various properties which can preferably be achieved is thus well defined for the person skilled in the art.

Example 1

A liquid-crystal mixture M-1 having the composition and properties as indicated in the following table is prepared.

| Composition Compound | | |
|---|---|---|
| No. | Abbreviation | |
| 1 | GGP-5-CL | 26.0 |
| 2 | PGIGI-3-CL | 8.0 |
| 3 | PGIGI-5-CL | 20.0 |
| 4 | PGIGI-5-F | 9.0 |
| 5 | PPTY-3-4 | 3.0 |
| 6 | PYGP-3-5 | 5.0 |
| 7 | PYGP-5-3 | 5.0 |
| 8 | CGPC-3-5 | 3.0 |
| 9 | CGPC-5-5 | 5.0 |
| 10 | CPGP-5-2 | 8.0 |
| 11 | CPGP-5-3 | 8.0 |
| Σ | | 100.0 |

| Physical properties | |
|---|---|
| T(N, I) = | 171° C. |
| $n_e$ (20° C., 589.3 nm) = | 1.7859 |
| Δn (20° C., 589.3 nm) = | 0.2954 |
| $\epsilon_{\parallel}$ (20° C., 1 kHz) = | 6.4 |
| Δε (20° C., 1 kHz) = | 2.0 |
| $\gamma_1$ (20° C.) = | 650 mPa · s |

This mixture is very highly suitable for applications in the microwave range, in particular for phase shifters.

TABLE 1

Properties of mixture M-1 at 30 GHz

| T/° C. | $\epsilon_{r,\perp}$ | $\epsilon_{r,\parallel}$ | tan $\delta_{\epsilon\, r,\perp}$ | tan $\delta_{\epsilon\, r,\parallel}$ | $\tau_{\epsilon\, r}$ | η |
|---|---|---|---|---|---|---|
| 11.27 | 2.40 | 2.97 | 0.0109 | 0.0026 | 0.19 | 17.45 |
| 29.71 | 2.41 | 2.97 | 0.0159 | 0.0037 | 0.19 | 11.70 |

TABLE 1-continued

Properties of mixture M-1 at 30 GHz

| T/° C. | $\epsilon_{r,\perp}$ | $\epsilon_{r,\parallel}$ | tan $\delta_{\epsilon\, r,\perp}$ | tan $\delta_{\epsilon\, r,\parallel}$ | $\tau_{\epsilon\, r}$ | η |
|---|---|---|---|---|---|---|
| 58.28 | 2.41 | 2.97 | 0.0252 | 0.0061 | 0.18 | 7.07 |
| 87.50 | 2.40 | 2.89 | 0.0372 | 0.0097 | 0.17 | 4.51 |

Note:
at 20° C., the following is obtained approximately by intrapolation: Δε$_{r\perp}$ = 0.56, tan δ$_{\epsilon\, r,\perp}$ = 0.013 and η = 14.5.

For comparison, the compound 4'-pentyl-4-cyanobiphenyl (also called 5CB or K15, Merck KGaA) gives tan $\delta_{\epsilon r,\perp}$=0.026 and η=4.3 at 20° C.

TABLE 2

Comparison of the properties at 30 GHz and 20° C.

| Example | Liquid crystal | Δε$_{r\perp}$ | δ$_{\epsilon\, r,\perp}$ | η |
|---|---|---|---|---|
| 1 | M-1 | 0.56 | 0.013 | 14.5 |
| 2 | M-2 | 0.56 | 0.014 | 15 |
| Comparison | 5CB | | 0.026 | 4.3 |

Example 2

A liquid-crystal mixture M-2 having the composition and properties as indicated in the following table is prepared.

| Composition Compound | | |
|---|---|---|
| No. | Abbreviation | |
| 1 | GGP-5-CL | 26.0 |
| 2 | PGIGI-3-CL | 8.0 |
| 3 | PGIGI-5-CL | 20.0 |
| 4 | PGIGI-5-F | 5.0 |
| 5 | PPTY-3-4 | 3.0 |
| 6 | PYGP-4-4 | 4.0 |
| 7 | PYGP-5-3 | 5.0 |
| 8 | CCZPC-3-5 | 3.0 |
| 9 | CGPC-3-5 | 3.0 |
| 10 | CGPC-5-5 | 5.0 |
| 11 | CPGP-5-2 | 8.0 |
| 12 | CPGP-5-3 | 8.0 |
| Σ | | 100.0 |

| Physical properties | |
|---|---|
| T(N, I) = | 179.5° C. |
| $n_e$ (20° C., 589.3 nm) = | 1.7861 |
| Δn (20° C., 589.3 nm) = | 0.3118 |

This mixture is very highly suitable for applications in the microwave range, in particular for phase shifters.

TABLE 3

Properties of mixture M-2 at 30 GHz

| T/° C. | $\epsilon_{r,\perp}$ | $\epsilon_{r,\parallel}$ | tan $\delta_{\epsilon\, r,\perp}$ | tan $\delta_{\epsilon\, r,\parallel}$ | $\tau_{\epsilon\, r}$ | FoM |
|---|---|---|---|---|---|---|
| 11.49 | 2.41 | 2.98 | 0.0108 | 0.0028 | 0.19 | 17.77 |
| 20.29 | 2.42 | 2.98 | 0.0130 | 0.0033 | 0.19 | 14.50 |
| 25.02 | 2.42 | 2.97 | 0.0143 | 0.0035 | 0.19 | 13.08 |
| 29.80 | 2.42 | 2.97 | 0.0155 | 0.0038 | 0.19 | 11.99 |
| 34.55 | 2.42 | 2.96 | 0.0169 | 0.0041 | 0.18 | 10.95 |

TABLE 3-continued

Properties of mixture M-2 at 30 GHz

| T/° C. | $\epsilon_{r,\perp}$ | $\epsilon_{r,\parallel}$ | $\tan\delta_{\epsilon\, r,\perp}$ | $\tan\delta_{\epsilon\, r,\parallel}$ | $\tau_{\epsilon\, r}$ | FoM |
|---|---|---|---|---|---|---|
| 58.29 | 2.41 | 2.93 | 0.0246 | 0.0062 | 0.18 | 7.20 |
| 77.56 | 2.40 | 2.90 | 0.0319 | 0.0087 | 0.17 | 5.36 |
| 97.57 | 2.40 | 2.86 | 0.0406 | 0.0116 | 0.16 | 4.00 |

Note:
at 20° C., the following is obtained approximately by intrapolation: $\Delta\epsilon_{r\perp}$ = 0.56, $\tan\delta_{\epsilon\, r,\perp}$ = 0.014 and η = 15.

Example 3

A liquid-crystal mixture M-3 having the composition and properties as indicated in the following table is prepared.

| Composition Compound | | |
|---|---|---|
| No. | Abbreviation | |
| 1 | GGP-3-CL | 10.0 |
| 2 | GGP-5-CL | 20.0 |
| 3 | PPTUI-3-2 | 20.0 |
| 4 | PPTUI-3-4 | 20.0 |
| 5 | PPTUI-4-4 | 16.0 |
| 6 | CPGP-5-2 | 7.0 |
| 7 | CPGP-5-3 | 7.0 |
| Σ | | 100.0 |

| Physical properties | |
|---|---|
| T(N, I) = | 170.1° C. |
| $n_e$ (20° C., 589.3 nm) = | 1.5267 |
| Δn (20° C., 589.3 nm) = | 0.2918 |
| $\epsilon_\parallel$ (20° C., 1 kHz) = | 7.8 |
| Δε (20° C., 1 kHz) = | 4.4 |
| $\gamma_1$ (20° C.) = | 698 mPa · s |

This mixture is very highly suitable for applications in the microwave range, in particular for phase shifters.

Example 4

A liquid-crystal mixture M-4 having the composition and properties as indicated in the following table is prepared.

| Composition Compound | | |
|---|---|---|
| No. | Abbreviation | |
| 1 | GGP-3-CL | 10.0 |
| 2 | GGP-5-CL | 19.0 |
| 3 | PPTUI-3-2 | 18.0 |
| 4 | PPTUI-3-4 | 18.0 |
| 5 | PPTUI-4-4 | 10.0 |
| 6 | PGIGP-3-5 | 6.00 |
| 7 | PPGU-3-F | 3.00 |
| 8 | CPGP-5-2 | 8.0 |
| 9 | CPGP-5-3 | 8.0 |
| Σ | | 100.0 |

| Physical properties | |
|---|---|
| T(N, I) = | 183.5° C. |
| Δn (20° C., 589.3 nm) = | 0.283 |
| $\epsilon_\parallel$ (20° C., 1 kHz) = | 8.0 |
| Δε (20° C., 1 kHz) = | 3.5 |
| $\gamma_1$ (20° C.) = | 753 mPa · s |

This mixture is very highly suitable for applications in the microwave range, in particular for phase shifters.

Example 5

A liquid-crystal mixture M-5 having the composition and properties as indicated in the following table is prepared.

| Composition Compound | | |
|---|---|---|
| No. | Abbreviation | |
| 1 | GGP-3-CL | 10.0 |
| 2 | GGP-5-CL | 17.0 |
| 3 | PPTUI-3-2 | 13.0 |
| 4 | PPTUI-3-4 | 13.0 |
| 5 | PPTUI-4-4 | 10.0 |
| 6 | PPGU-3-F | 3.0 |
| 7 | PPGU-4-F | 3.0 |
| 8 | PPGU-V2-F | 3.0 |
| 9 | PGIGP-3-5 | 7.0 |
| 10 | PGIGP-5-5 | 7.0 |
| 11 | CPGP-5-2 | 7.0 |
| 12 | CPGP-5-3 | 7.0 |
| Σ | | 100.0 |

Physical properties

This mixture is very highly suitable for applications in the microwave range, in particular for phase shifters.

Example 6

A liquid-crystal mixture M-6 having the composition and properties as indicated in the following table is prepared.

| Composition Compound | | |
|---|---|---|
| No. | Abbreviation | |
| 1 | GGP-5-CL | 17.0 |
| 2 | PPTUI-3-2 | 20.0 |
| 3 | PPTUI-3-4 | 20.0 |
| 4 | PPTUI-4-4 | 10.0 |
| 5 | PPGU-3-F | 3.0 |
| 6 | PPGU-4-F | 3.0 |
| 7 | PPGU-V2-F | 3.0 |
| 8 | PGIGP-3-4 | 5.0 |
| 9 | PGIGP-3-5 | 5.0 |
| 10 | CPGP-5-2 | 7.0 |
| 11 | CPGP-5-3 | 7.0 |
| Σ | | 100.0 |

| Physical properties | |
|---|---|
| T(N, I) = | 198.0° C. |
| $\epsilon_\parallel$ (20° C., 1 kHz) = | 7.7 |
| Δε (20° C., 1 kHz) = | 3.5 |

This mixture is very highly suitable for applications in the microwave range, in particular for phase shifters.

Example 7

A liquid-crystal mixture M-7 having the composition and properties as indicated in the following table is prepared.

| Composition Compound | | |
|---|---|---|
| No. | Abbreviation | |
| 1 | GGP-3-CL | 10.0 |
| 2 | GGP-5-CL | 20.0 |
| 3 | PPTUI-3-2 | 15.0 |
| 4 | PPTUI-3-4 | 20.0 |
| 5 | PPGU-3-F | 3.0 |
| 6 | PPGU-4-F | 3.0 |
| 7 | PPGU-V2-F | 3.0 |
| 8 | PGIGP-3-4 | 5.0 |
| 9 | PGIGP-3-5 | 5.0 |
| 10 | CPGP-5-2 | 8.0 |
| 11 | CPGP-5-3 | 8.0 |
| Σ | | 100.0 |

| Physical properties | |
|---|---|
| T(N, I) = | 193.0° C. |
| $\epsilon_{\parallel}$ (20° C., 1 kHz) = | 8.7 |
| Δε (20° C., 1 kHz) = | 3.5 |

This mixture is very highly suitable for applications in the microwave range, in particular for phase shifters.

Example 8

A liquid-crystal mixture M-8 having the composition and properties as indicated in the following table is prepared.

| Composition Compound | | |
|---|---|---|
| No. | Abbreviation | |
| 1 | GGP-3-CL | 10.0 |
| 2 | GGP-5-CL | 19.0 |
| 3 | PPTUI-3-2 | 18.0 |
| 4 | PPTUI-3-4 | 18.0 |
| 5 | PPTUI-4-4 | 10.0 |
| 6 | PPGU-3-F | 2.0 |
| 7 | PPGU-4-F | 2.0 |
| 8 | PPGU-V2-F | 2.0 |
| 9 | PGIGP-3-5 | 5.0 |
| 10 | CPGP-5-2 | 7.0 |
| 11 | CPGP-5-3 | 7.0 |
| Σ | | 100.0 |

Physical properties

This mixture is very highly suitable for applications in the microwave range, in particular for phase shifters.

Example 9

A liquid-crystal mixture M-9 having the composition and properties as indicated in the following table is prepared.

| Composition Compound | | |
|---|---|---|
| No. | Abbreviation | |
| 1 | PGP-2-5 | 10.0 |
| 2 | PGP-3-4 | 10.0 |
| 3 | PGP-3-7 | 15.0 |
| 4 | PGP-2-2V | 5.0 |
| 5 | PYP-2-2V | 10.0 |
| 6 | PYP-2-4 | 10.0 |
| 7 | PYP-2-5 | 20.0 |
| 8 | PYP-3-5 | 15.0 |
| 9 | PGIGP-3-5 | 5.0 |
| Σ | | 100.0 |

Physical properties

This mixture is very highly suitable for applications in the microwave range, in particular for phase shifters.

Example 10

A liquid-crystal mixture M-10 having the composition and properties as indicated in the following table is prepared.

| Composition Compound | | |
|---|---|---|
| No. | Abbreviation | |
| 1 | GGP-3-F | 10.0 |
| 2 | GGP-5-F | 10.0 |
| 3 | GGP-3-CL | 10.0 |
| 4 | GGP-4-CL | 20.0 |
| 5 | GGP-5-CL | 20.0 |
| 6 | GGP-6-CL | 10.0 |
| 7 | GGPP-5-3 | 5.0 |
| 8 | PGGP-3-5 | 5.0 |
| 9 | PGGP-3-6 | 5.0 |
| 10 | PGGP-5-3 | 5.0 |
| Σ | | 100.0 |

| Physical properties | |
|---|---|
| T(N, I) = | 134.5° C. |
| $n_e$ (20° C., 589.3 nm) = | 1.8036 |
| Δn (20° C., 589.3 nm) = | 0.2774 |
| $\epsilon_{\parallel}$ (20° C., 1 kHz) = | 15.2 |
| Δε (20° C., 1 kHz) = | 10.2 |
| $\gamma_1$ (20° C.) = | 758 mPa · s |

This mixture is very highly suitable for applications in the microwave range, in particular for phase shifters.

Example 11

A liquid-crystal mixture M-11 having the composition and properties as indicated in the following table is prepared.

| Composition Compound | | |
|---|---|---|
| No. | Abbreviation | |
| 1 | GGP-3-F | 5.0 |
| 2 | GGP-3-CL | 10.0 |
| 3 | GGP-4-CL | 10.0 |
| 4 | GGP-5-CL | 15.0 |
| 5 | GGP-5-3 | 20.0 |
| 6 | PGP-2-5 | 10.0 |
| 7 | PGP-3-7 | 15.0 |
| 8 | PGP-2-2V | 10.0 |
| 9 | PGGP-3-5 | 5.0 |
| Σ | | 100.0 |

| Physical properties | |
|---|---|
| $n_e$ (20° C., 589.3 nm) = | 1.7885 |
| $\Delta n$ (20° C., 589.3 nm) = | 0.2640 |
| $\epsilon_{\parallel}$ (20° C., 1 kHz) = | 8.8 |
| $\Delta\epsilon$ (20° C., 1 kHz) = | 4.7 |
| $\gamma_1$ (20° C.) = | 660 mPa · s |

This mixture is very highly suitable for applications in the microwave range, in particular for phase shifters.

Example 12

A liquid-crystal mixture M-12 having the composition and properties as indicated in the following table is prepared.

| Composition Compound | | |
|---|---|---|
| No. | Abbreviation | |
| 1 | GGP-3-CL | 10.0 |
| 2 | GGP-4-CL | 20.0 |
| 3 | GGP-5-CL | 20.0 |
| 4 | GGP-6-CL | 10.0 |
| 5 | GGP-5-3 | 25.0 |
| 6 | PGGP-3-5 | 5.0 |
| 7 | PGGP-3-6 | 5.0 |
| 8 | PGGP-5-3 | 5.0 |
| Σ | | 100.0 |

| Physical properties | |
|---|---|
| T(N, I) = | 124.5° C. |
| $n_e$ (20° C., 589.3 nm) = | 1.7951 |
| $\Delta n$ (20° C., 589.3 nm) = | 0.2709 |
| $\epsilon_{\parallel}$ (20° C., 1 kHz) = | 11.6 |
| $\Delta\epsilon$ (20° C., 1 kHz) = | 6.8 |
| $\gamma_1$ (20° C.) = | 895 mPa · s |

This mixture is very highly suitable for applications in the microwave range, in particular for phase shifters.

Example 13

A liquid-crystal mixture M-13 having the composition and properties as indicated in the following table is prepared.

| Composition Compound | | |
|---|---|---|
| No. | Abbreviation | |
| 1 | GGP-3-CL | 5.0 |
| 2 | GGP-5-CL | 19.0 |
| 3 | PGU-7-F | 2.0 |
| 4 | PPTUI-3-2 | 18.0 |
| 5 | PPTUI-3-4 | 18.0 |
| 6 | PPTUI-4-4 | 10.0 |
| 7 | PPGU-7-F | 2.0 |
| 8 | PGIGP-3-5 | 6.0 |
| 9 | DPGU-3-F | 2.0 |
| 10 | DPGU-3-OT | 2.0 |
| 11 | CPGP-5-2 | 8.0 |
| 12 | CPGP-5-3 | 8.0 |
| Σ | | 100.0 |

| Physical properties | |
|---|---|
| T(N, I) = | 184.5° C. |

This mixture is very highly suitable for applications in the microwave range, in particular for phase shifters.

TABLE 4

Properties of mixture M-13 at 30 GHz

| T/° C. | $\epsilon_{r,\perp}$ | $\epsilon_{r,\parallel}$ | tan $\delta_{\epsilon r,\perp}$ | tan $\delta_{\epsilon r,\parallel}$ | $\tau_{\epsilon r}$ | $\eta$ |
|---|---|---|---|---|---|---|
| 9.47 | 2.51 | 2.92 | 0.0094 | 0.0035 | 0.140 | 15.0 |
| 19.67 | 2.51 | 2.92 | 0.0115 | 0.0041 | 0.139 | 12.1 |
| 30.07 | 2.49 | 2.94 | 0.0135 | 0.0046 | 0.152 | 11.2 |
| 40.52 | 2.44 | 2.96 | 0.0169 | 0.0046 | 0.175 | 10.3 |
| 50.17 | 2.36 | 2.96 | 0.0214 | 0.0050 | 0.204 | 9.48 |
| 59.99 | 2.34 | 2.94 | 0.0246 | 0.0056 | 0.204 | 8.24 |
| 70.41 | 2.34 | 2.93 | 0.0276 | 0.0061 | 0.199 | 7.22 |
| 79.74 | 2.35 | 2.91 | 0.0291 | 0.0067 | 0.195 | 6.69 |
| 84.52 | 2.35 | 2.91 | 0.0295 | 0.0071 | 0.192 | 6.51 |

Note:
at 20° C., the following is obtained approximately by intrapolation: $\Delta\epsilon_{r\perp}$ = 2.51, tan $\delta_{\epsilon r, \perp}$ = 0.0115, $\tau_{\epsilon r}$ = 0.140 and $\eta$ = 14.5.

Example 14

A liquid-crystal mixture M-14 having the composition and properties as indicated in the following table is prepared.

| Composition Compound | | |
|---|---|---|
| No. | Abbreviation | |
| 1 | GGP-5-CL | 20.0 |
| 2 | PGU-3-CL | 2.0 |
| 3 | PGU-4-OT | 2.0 |
| 4 | PGP-F-OT | 3.0 |
| 5 | PPTUI-3-2 | 13.0 |
| 6 | PPTUI-3-4 | 15.0 |
| 7 | PPTUI-4-4 | 20.0 |
| 8 | PPGU-7-F | 2.0 |
| 9 | PGIGP-3-5 | 6.0 |
| 10 | CPTP-3-2 | 3.0 |

-continued

| | | |
|---|---|---|
| 11 | DPGU-3-F | 2.0 |
| 12 | DPGU-3-OT | 2.0 |
| 13 | CPGP-5-2 | 4.0 |
| 14 | CPGP-5-3 | 6.0 |
| Σ | | 100.0 |

Physical properties

| | |
|---|---|
| T(N, I) = | 175.5° C. |

This mixture is very highly suitable for applications in the microwave range, in particular for phase shifters.

Example 15

A liquid-crystal mixture M-15 having the composition and properties as indicated in the following table is prepared.

| Composition Compound | | |
|---|---|---|
| No. | Abbreviation | |
| 1 | GGP-5-CL | 10.0 |
| 2 | GGP-6-CL | 5.0 |
| 3 | PGP-3-2V | 3.0 |
| 4 | PGP-2-2V | 3.0 |
| 5 | PPTUI-3-2 | 15.0 |
| 6 | PPTUI-3-4 | 18.0 |
| 7 | PPTUI-4-4 | 21.0 |
| 8 | PPGU-7-F | 2.0 |
| 9 | PPGU-V2-F | 2.0 |
| 10 | PGIGP-3-5 | 7.0 |
| 11 | CPTP-3-2 | 4.0 |
| 12 | CPGU-3-OT | 2.0 |
| 13 | CPGU-4-OT | 2.0 |
| 14 | DPGU-3-OT | 2.0 |
| 15 | CPGP-5-2 | 4.0 |
| Σ | | 100.0 |

Physical properties

| | |
|---|---|
| T(N, I) = | 178° C. |

This mixture is very highly suitable for applications in the microwave range, in particular for phase shifters.

Example 16

A liquid-crystal mixture M-16 having the composition and properties as indicated in the following table is prepared.

| Composition Compound | | |
|---|---|---|
| No. | Abbreviation | |
| 1 | GGP-5-CL | 20.0 |
| 2 | GGP-5-3 | 12.0 |
| 3 | PPTUI-3-2 | 12.0 |
| 4 | PPTUI-3-4 | 16.0 |
| 5 | PPTUI-4-4 | 20.0 |
| 6 | PGUQU-5-F | 5.0 |
| 7 | PGGP-3-5 | 5.0 |
| 8 | PGGP-3-6 | 4.0 |
| 9 | APGP-3-3 | 3.0 |
| 10 | APGP-3-4 | 3.0 |
| Σ | | 100.0 |

-continued

Physical properties

| | |
|---|---|
| T(N, I) = | 159.5° C. |
| $\epsilon_\parallel$ (20° C., 1 kHz) = | 7.9 |
| $\Delta\epsilon$ (20° C., 1 kHz) = | 4.3 |
| $\gamma_1$ (20° C.) = | 686 mPa · s |

This mixture is very highly suitable for applications in the microwave range, in particular for phase shifters.

Example 17

A liquid-crystal mixture M-17 having the composition and properties as indicated in the following table is prepared.

| Composition Compound | | |
|---|---|---|
| No. | Abbreviation | |
| 1 | GGP-5-3 | 10.0 |
| 2 | PPTUI-3-F | 8.0 |
| 3 | PPTUI-4-F | 8.0 |
| 4 | PPTUI-3-2 | 12.0 |
| 5 | PPTUI-3-4 | 16.0 |
| 6 | PPTUI-4-4 | 20.0 |
| 7 | PPTUI-3-A4 | 5.0 |
| 8 | PGUQU-5-F | 7.0 |
| 9 | PGGP-3-5 | 4.0 |
| 10 | PGGP-3-6 | 4.0 |
| 11 | APGP-3-3 | 3.0 |
| 12 | APGP-3-4 | 3.0 |
| Σ | | 100.0 |

Physical properties

| | |
|---|---|
| T(N, I) = | 169° C. |

This mixture is very highly suitable for applications in the microwave range, in particular for phase shifters.

The invention claimed is:

1. A liquid-crystal medium, which comprises:
at least one compound of the formula I and
at least one compound of the formula II and
at least one compound of the formula III:

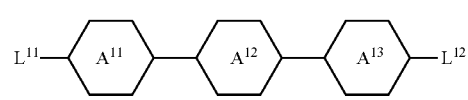

I in which $L^{11}$ denotes $R^{11}$ or $X^{11}$, $L^{12}$ denotes $R^{12}$ or $X^{12}$, $R^{11}$ and $R^{12}$, independently of one another, denote H, unfluorinated alkyl or unfluorinated alkoxy having 1 to 15 C atoms or unfluorinated alkenyl, unfluorinated alkenyloxy or unfluorinated alkoxyalkyl having 2 to 15 C atoms, $X^{11}$ and $X^{12}$, independently of one another, denote H, F, Cl, —CN, —NCS, —SF$_5$, fluorinated alkyl or fluorinated alkoxy having 1 to 7 C atoms or fluorinated alkenyl, unfluorinated alkenyloxy or unfluorinated or fluorinated alkoxyalkyl having 2 to 7 C atoms, and

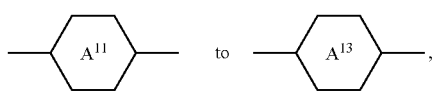 to , independently of one another, denote

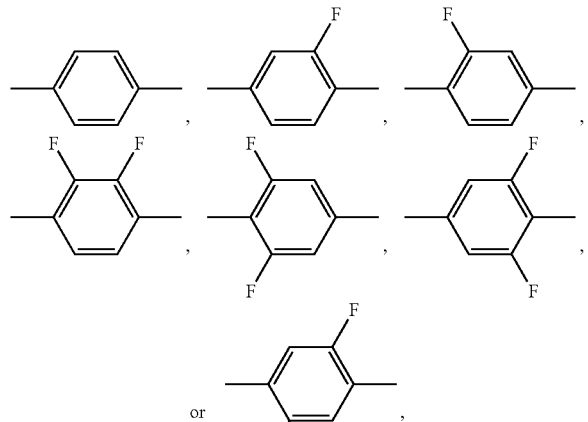

II

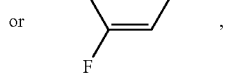

in which
L$^{21}$ denotes R$^{21}$ and, in the case where Z$^{21}$ and/or Z$^{22}$ denote trans-CH=CH— or trans-CF=CF—, alternatively denotes X$^{21}$,
L$^{22}$ denotes R$^{22}$ and, in the case where Z$^{21}$ and/or Z$^{22}$ denote trans-CH=CH— or trans-CF=CF—, alternatively denotes X$^{22}$,
R$^{21}$ and R$^{22}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
X$^{21}$ and X$^{22}$, independently of one another, denote F or Cl, —CN, —NCS, —SF$_5$, fluorinated alkyl or fluorinated alkoxy having 1 to 7 C atoms or fluorinated alkenyl, fluorinated alkenyloxy or fluorinated alkoxyalkyl having 2 to 7 C atoms,
one of
Z$^{21}$ and Z$^{22}$ denotes trans-CH=CH—, trans-CF=CF— or —C≡C— and the other, independently thereof, denotes trans-CH=CH—, trans-CF=CF— or a single bond, and

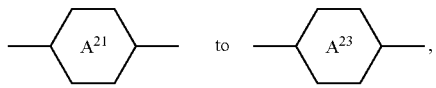

independently of one another, denote

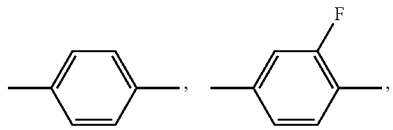

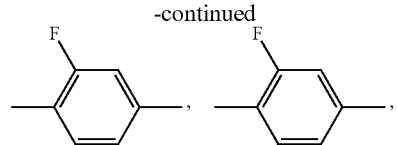

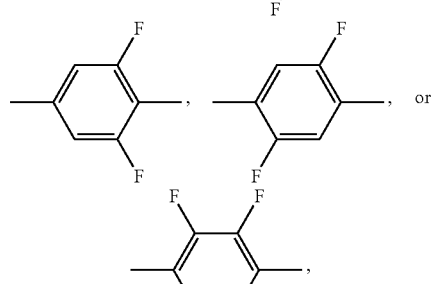

III

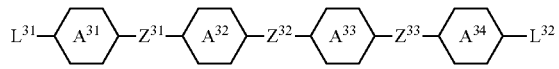

in which
L$^{31}$ denotes R$^{31}$ or X$^{31}$,
L$^{32}$ denotes R$^{32}$ or X$^{32}$,
R$^{31}$ and R$^{32}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
X$^{31}$ and X$^{32}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms,
Z$^{31}$ to Z$^{33}$, independently of one another, denote trans-CH=CH—, trans-CF=CF—, —C≡C— or a single bond, and

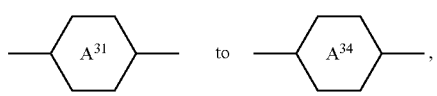

independently of one another, denote

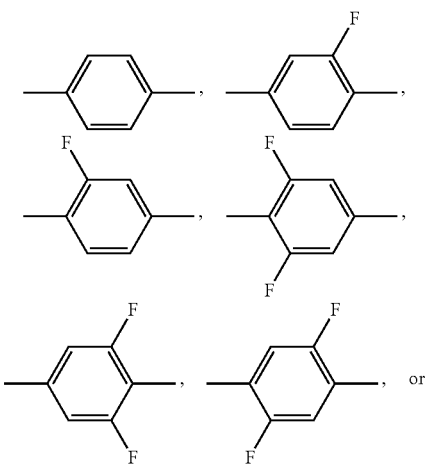

-continued

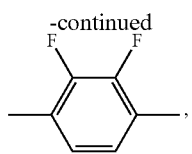

and
optionally one or more further compounds,
provided that the liquid-crystal medium has a birefringence, Δn, at 20° C. and 589 nm, of 0.250 or more.

2. The liquid-crystal medium according to claim 1, wherein the concentration of the compounds of the formula I in the medium is in the range from in total 15% to 70%.

3. The liquid-crystal medium according to claim 1, wherein the concentration of the compounds of the formula II in the medium is in the range from in total 1% to 60%.

4. The liquid-crystal medium according to claim 1, which comprises one or more compounds selected from the group of the compounds of the formulae I-1 to I-3:

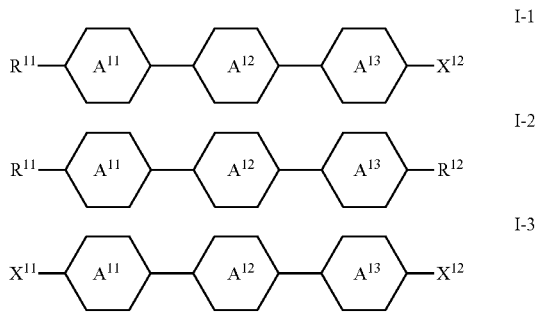

in which the parameters have the respective meanings given for formula I.

5. A component for high-frequency technology, which comprises a liquid crystal medium according to claim 1.

6. A component according to claim 5, which is suitable for operation in the microwave range.

7. A component according to claim 5, which is a phase shifter.

8. A process for the preparation of a liquid-crystal medium according to claim 1, comprising mixing one or more compounds of the formula I with one or more compounds of the formulae II and one or more compounds of the formula III and optionally with one or more further compounds and/or with one or more additives.

9. Microwave antenna array, which comprises a microwave antenna array incorporating one or more components according to claim 5.

10. A liquid-crystal medium according to claim 1, wherein, in formula II, $R^{21}$ and $R^{22}$, independently of one another, denote H, unfluorinated alkyl or unfluorinated alkoxy having 3 to 10 C atoms or unfluorinated alkenyl, unfluorinated alkenyloxy or unfluorinated alkoxyalkyl having 3 to 10 C atoms.

11. A liquid-crystal medium according to claim 1, wherein the liquid-crystal medium has a birefringence, Δn, at 20° C. and 589 nm, of 0.300 or more.

12. A liquid-crystal medium according to claim 1, wherein the liquid-crystal medium has a birefringence, Δn, at 20° C. and 589 nm, of 0.350 or more.

13. A liquid-crystal medium according to claim 1, wherein the liquid-crystal medium has a birefringence, Δn, at 20° C. and 589 nm, of from 0.250 to 0.90.

14. A liquid-crystal medium according to claim 1, wherein the liquid-crystal medium has a birefringence, Δn, at 20° C. and 589 nm, of from 0.250 to 0.85.

15. A liquid-crystal medium according to claim 1, wherein the liquid-crystal medium has a birefringence, Δn, at 20° C. and 589 nm, of from 0.250 to 0.80.

16. A liquid-crystal medium according to claim 1, wherein the liquid-crystal medium has a birefringence, Δn, at 20° C. and 589 nm, of from 0.300 to 0.90.

17. A liquid-crystal medium according to claim 1, wherein the liquid-crystal medium has a birefringence, Δn, at 20° C. and 589 nm, of from 0.300 to 0.85.

18. A liquid-crystal medium according to claim 1, wherein the liquid-crystal medium has a birefringence, Δn, at 20° C. and 589 nm, of from 0.300 to 0.80.

19. A liquid-crystal medium according to claim 1, wherein the liquid-crystal medium has a birefringence, Δn, at 20° C. and 589 nm, of from 0.350 to 0.90.

20. A liquid-crystal medium according to claim 1, wherein the liquid-crystal medium has a birefringence, Δn, at 20° C. and 589 nm, of from 0.350 to 0.85.

21. A liquid-crystal medium according to claim 1, wherein the liquid-crystal medium has a birefringence, Δn, at 20° C. and 589 nm, of from 0.350 to 0.80.

22. A component for high-frequency technology, which comprises a liquid crystal medium according to claim 2.

23. A component for high-frequency technology, which comprises a liquid crystal medium according to claim 3.

24. A component for high-frequency technology, which comprises a liquid crystal medium according to claim 4.

25. A component for high-frequency technology, which comprises a liquid crystal medium according to claim 10.

26. A component for high-frequency technology, which comprises a liquid crystal medium according to claim 11.

27. A component for high-frequency technology, which comprises a liquid crystal medium according to claim 12.

28. A component for high-frequency technology, which comprises a liquid crystal medium according to claim 13.

29. A component for high-frequency technology, which comprises a liquid crystal medium according to claim 14.

30. A component for high-frequency technology, which comprises a liquid crystal medium according to claim 15.

31. A component for high-frequency technology, which comprises a liquid crystal medium according to claim 16.

32. A component for high-frequency technology, which comprises a liquid crystal medium according to claim 17.

33. A component for high-frequency technology, which comprises a liquid crystal medium according to claim 18.

34. A component for high-frequency technology, which comprises a liquid crystal medium according to claim 19.

35. A component for high-frequency technology, which comprises a liquid crystal medium according to claim 20.

36. A component for high-frequency technology, which comprises a liquid crystal medium according to claim 21.

37. A component for high-frequency technology, which is a phase shifter, varactor, wireless or radio wave antenna array, or matching circuit adaptive filter, which comprises a liquid crystal medium according to claim 1.

38. A component for high-frequency technology, which comprises a cell containing a liquid crystal medium according to claim 1.

39. A liquid-crystal medium according to claim 1, wherein the liquid-crystal medium comprises at least one compound of the formula I wherein $X^{12}$ is —NCS, at least one compound of the formula II wherein $X^{22}$ is —NCS, or at least one compound of the formula III wherein $X^{32}$ is —NCS.

40. A liquid-crystal medium according to claim 1, wherein the liquid-crystal medium comprises at least one compound of the formula I wherein $X^{12}$ is —NCS or at least one compound of the formula II wherein $X^{22}$ is —NCS.

41. A component for high-frequency technology, which comprises a liquid crystal medium according to claim 39.

42. A component for high-frequency technology, which comprises a liquid crystal medium according to claim 40.

43. A liquid-crystal medium according to claim 1, wherein the total concentration of compounds of formula I in the liquid crystal medium is 20-40% by weight and the total concentration of compounds of formula II in the liquid crystal medium is 40-70% by weight.

44. A liquid-crystal medium according to claim 1, wherein the total concentration of compounds of formula I in the liquid crystal medium is 25-35% by weight and the total concentration of compounds of formula II in the liquid crystal medium is 40-70% by weight.

45. The liquid-crystal medium according to claim 1, wherein the total concentration of compounds of formulae I, II and III in the liquid crystal medium is 60% by weight or more.

46. The liquid-crystal medium according to claim 1, which additionally comprises one or more compounds of the following formulae:

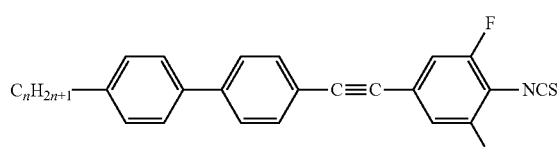

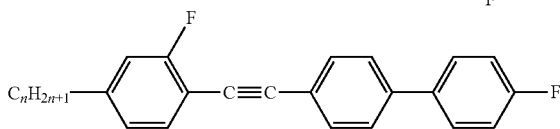

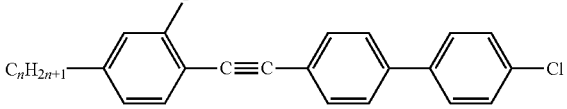

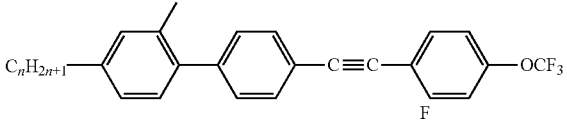

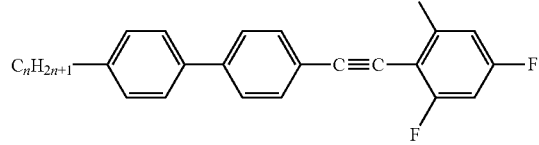

in which n denotes an integer in the range from 0 to 7.

47. The liquid-crystal medium according to claim 4, which additionally comprises one or both of the following compounds:

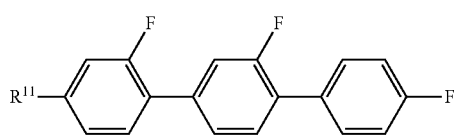

I-1c-1

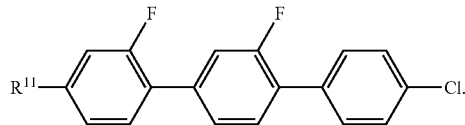

I-1c-2

48. The liquid-crystal medium according to claim 4, which comprises one or more compounds of the formula I-2 which are selected from compounds of the following formulae:

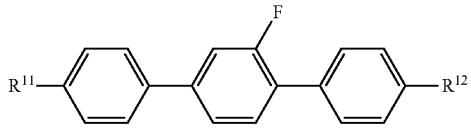

I-2a-1

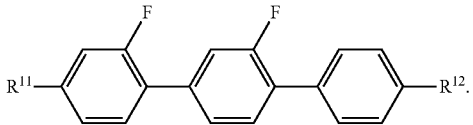

I-2a-2

49. The liquid-crystal medium according to claim 1, which comprises one or more compounds of the formula II which are selected from compounds of the following formulae:

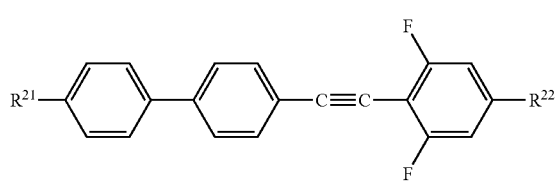

II-1a

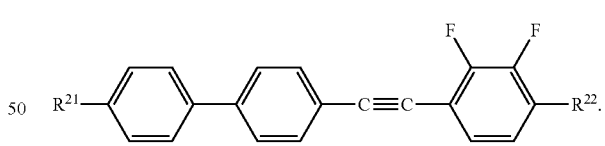

II-1b

50. The liquid-crystal medium according to claim 1, which comprises one or more compounds of the formula III which are selected from compounds of the following formulae:

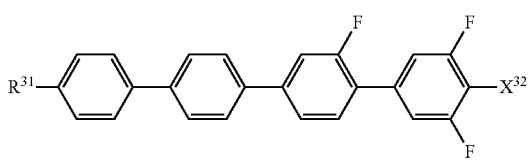

III-1a

-continued

III-1b
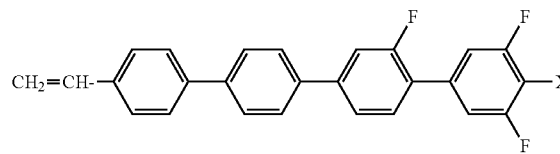

III-1c
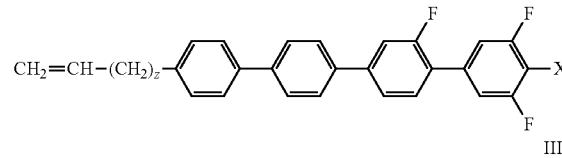

III-1d
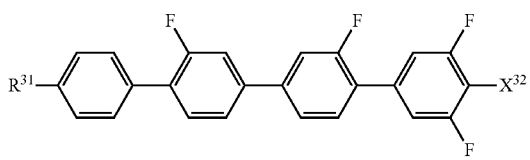

in which:
X³² denotes H, F, Cl, —CN, —NCS, —SF₅, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms,
R³¹ has the meaning indicated in claim 1,
n denotes 1 to 7, and
z denotes 0, 1, 2, 3 or 4, III-2a
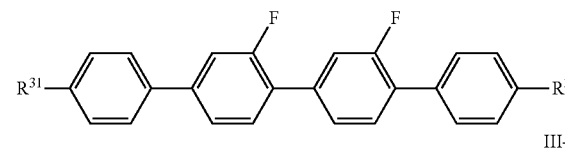

III-2b
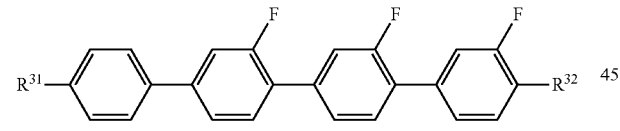

-continued

III-3a
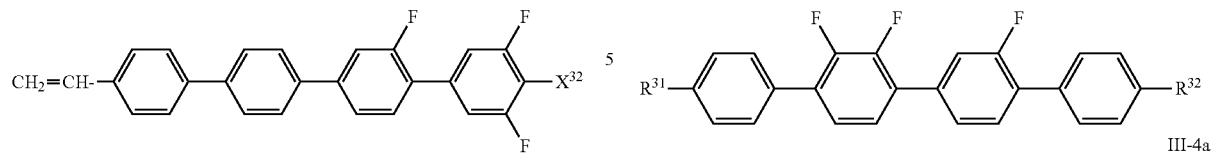

III-4a
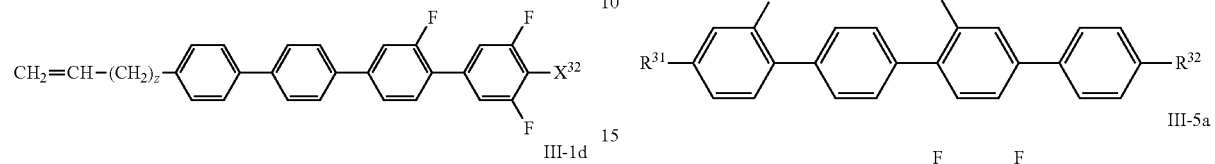

III-5a
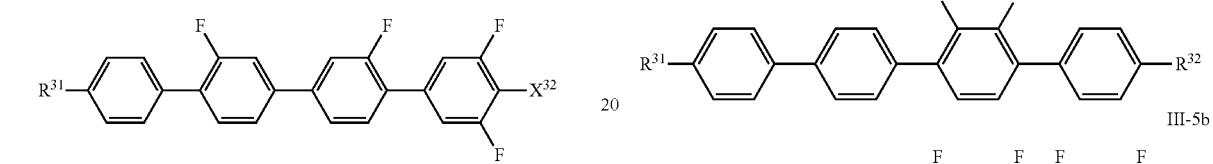

III-5b
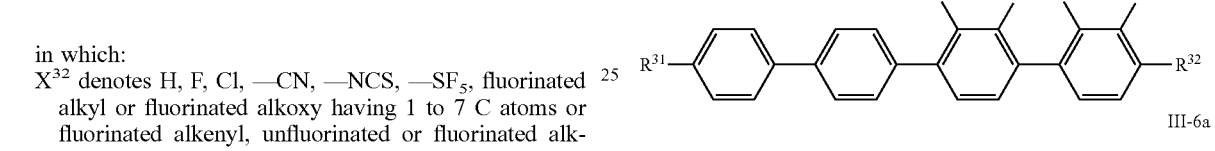

III-6a
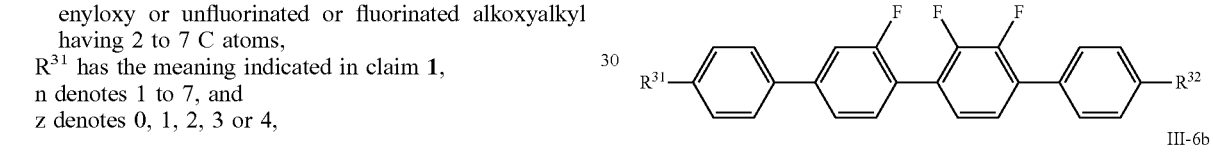

III-6b
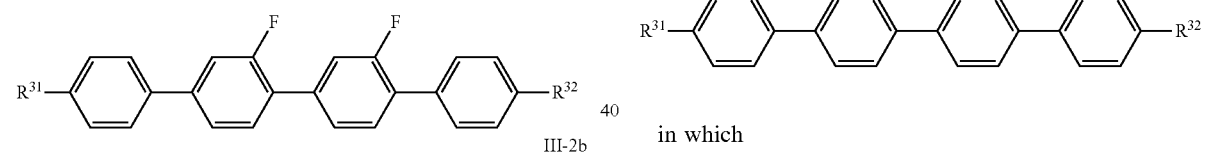

in which
R³¹ and R³² has the meaning indicated in claim 1,
n and m, independently of one another, denote an integer in the range from 0 to 15, and
z denotes 0, 1, 2, 3 or 4.

* * * * *